United States Patent
Tsurudome

(10) Patent No.: US 7,596,658 B2
(45) Date of Patent: Sep. 29, 2009

(54) METHOD FOR EXPANDING CAPACITY OF REPLICATION VOLUME

(75) Inventor: Ikuo Tsurudome, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 411 days.

(21) Appl. No.: 11/492,861

(22) Filed: Jul. 26, 2006

(65) Prior Publication Data

US 2007/0283089 A1   Dec. 6, 2007

(30) Foreign Application Priority Data

May 31, 2006   (JP)   .............................. 2006-152086

(51) Int. Cl.
   *G06F 12/00*   (2006.01)
(52) U.S. Cl. ........................ 711/112; 711/114; 711/161; 711/162
(58) Field of Classification Search ........................ None
   See application file for complete search history.

(56) References Cited

U.S. PATENT DOCUMENTS 6,725,328 B2   4/2004   Kano et al.
6,836,819 B2   12/2004  Kano et al.
2004/0172510 A1*  9/2004  Nagashima et al. .......... 711/162
2005/0163014 A1*  7/2005  Soeda ........................ 369/84

FOREIGN PATENT DOCUMENTS

JP   2003-015915   1/2003

* cited by examiner

*Primary Examiner*—Christian P Chace
*Assistant Examiner*—Alan M Otto
(74) *Attorney, Agent, or Firm*—Antonelli, Terry, Stout & Kraus, LLP.

(57) ABSTRACT

A management computer comprises: a cascade configuration storage section which stores volume cascade configuration information which is information related to the configuration of the volume cascade; an expansion target volume determination section which determines any logical volume of the plurality of logical volumes as a target of expansion; a cascade configuration specifying section which specifies, from the volume cascade configuration information, other logical volume of the volume cascade to which the expansion target logical volume belongs; and a capacity expansion control section which transmits, to the storage system group, a capacity expansion instruction which designates two or more target volumes and the capacity obtained after expanding each of the two or more target volumes, the two or more target volumes constituting a target volume cascade comprising the expansion target logical volume and the specified other logical volume.

2 Claims, 23 Drawing Sheets

FIG. 3

LOGICAL REGION MANAGEMENT TABLE 139

| LOGICAL REGION-ID | RG-ID | CAPACITY | ALLOCATION FLAG |
|---|---|---|---|
| LDEV11 | RG1 | 1G | 1 |
| LDEV12 | RG1 | 1G | 0 |
| LDEV13 | RG1 | 1G | 1 |
| ... | ... | ... | ... |
| LDEV2n | RG2 | 1G | 2 |

FIG. 4

VOLUME MANAGEMENT TABLE 141

| LU-ID | LOGICAL REGION-ID | STORAGE SYSTEM ID | EXPANSION DETERMINATION USAGE RATE | MINIMUM INCREASED CAPACITY | EXPANSION METHOD | REARRANGEMENT METHOD | REPLICATION AUTOMATIC REMOVAL SETTING |
|---|---|---|---|---|---|---|---|
| 0:01 | LDEV11<br>LDEV13<br>LDEV22 | 9800V001 | 95% | 10G | NONSIMULTANEOUS CHANGING | EXPANSION AFTER REARRANGEMENT | POSSIBLE |
| 0:02 | LDEV12<br>LDEV13<br>LDEV14 | 9800V001 | 80% | 20G | SIMULTANEOUS CHANGING | REARRANGEMENT AFTER EXPANSION | IMPOSSIBLE |
| 0:03 | LDEV31 | 9800V100 | N/A | N/A | N/A | N/A | N/A |

FIG. 5

REPLICATION DEFINITION TABLE 145

| ID | STORAGE SYSTEM ID | LU-ID | VOLUME TYPE | PRIMARY DESTINATION INFORMATION | CAPACITY |
|---|---|---|---|---|---|
| 1 | 9980V001 | 0:01 | PRIMARY | NONE | 10G |
| 2 | 9980V001 | 0:11 | SECONDARY | 9980V001:0:01 | 10G |
| 3 | 9980V001 | 0:21 | SECONDARY/PRIMARY | 9980V001:0:01 | 10G |
| 4 | 9980V001 | 1:11 | SECONDARY/PRIMARY | 9980V001:0:01 | 20G |
| 5 | 9980V001 | 0:41 | SECONDARY | 9980V001:0:21 | 20G |
| 6 | 9980V001 | 0:51 | SECONDARY | 9980V001:0:21 | 10G |
| 7 | 9980V001 | 1:21 | SECONDARY | 9980V001:1:11 | 30G |
| 8 | 9980V002 | 1:31 | SECONDARY/PRIMARY | 9980V001:1:11 | 20G |
| 9 | 9980V002 | 1:41 | SECONDARY | 9980V002:1:31 | 20G |
| .. | .. | .. | .. | .. | .. |

FIG. 6

EXPANSION TARGET REPLICATION VOLUME TABLE 147

| ID | HIERARCHY LEVEL | STORAGE SYSTEM ID | LU-ID | VOLUME TYPE | PRIMARY DESTINATION INFORMATION | CAPACITY | OPERATING STATE |
|---|---|---|---|---|---|---|---|
| 1 | 0 | 9980V001 | 0:01 | PRIMARY | NONE | 10G | UNOPERATED |
| 2 | 1 | 9980V001 | 0:11 | SECONDARY | 9980V001:0:01 | 10G | UNOPERATED |
| 3 | 1 | 9980V001 | 0:21 | SECONDARY/PRIMARY | 9980V001:0:01 | 10G | IN OPERATION |
| 4 | 2 | 9980V001 | 1:11 | SECONDARY/PRIMARY | 9980V001:0:01 | 20G | UNOPERATED |
| 5 | 2 | 9980V001 | 0:41 | SECONDARY | 9980V001:0:21 | 20G | COMPLETED |
| 6 | 2 | 9980V001 | 0:51 | SECONDARY | 9980V001:0:21 | 10G | COMPLETED |
| 7 | 3 | 9980V001 | 1:21 | SECONDARY/PRIMARY | 9980V001:1:11 | 30G | COMPLETED |
| 8 | ⋮ | 9980V002 | 1:31 | SECONDARY | 9980V001:1:11 | 20G | IN OPERATION |
| 9 | | 9980V002 | 1:41 | SECONDARY | 9980V002:1:31 | 20G | COMPLETED |
| ⋮ | | ⋮ | | | | | |

FIG. 7

VOLUME EXPANSION/REARRANGEMENT RELATION TABLE 143

| # | BEFORE EXECUTION | | | AFTER EXECUTION | | |
|---|---|---|---|---|---|---|
| | STORAGE SYSTEM ID | LU-ID | LOGICAL REGION ID | STORAGE SYSTEM ID | LU-ID | LOGICAL REGION ID |
| 1 | 9980V001 | 0:21 | LDEV90 LDEV12 LDEV3 | 9980V002 | 1:51 | LDEV91 LDEV192 LDEV93 |
| .. | .. | .. | .. | .. | .. | .. |

STORAGE SYSTEM:9980V001

EXPANSION TARGET REPLICATION VOLUME TABLE 147

| ID | STORAGE SYSTEM ID | LU-ID | VOLUME TYPE | PRIMARY DESTINATION INFORMATION | CAPACITY | OPERATING STATE |
|---|---|---|---|---|---|---|
| 1 | 9980V001 | V1 | PRIMARY | NONE | 10 | UNEXECUTED |
| 2 | 9980V001 | V2 | SECONDARY/ PRIMARY | V1 | 10 | UNEXECUTED |
| 3 | 9980V001 | V3 | SECONDARY/ | V1 | 10 | UNEXECUTED |
| 4 | 9980V001 | V4 | SECONDARY/ | V2 | 10 | UNEXECUTED |
| 5 | 9980V001 | V5 | SECONDARY/ | V2 | 10 | UNEXECUTED |

EXPANSION TARGET REPLICATION VOLUME TABLE 147

| ID | STORAGE SYSTEM ID | LU-ID | VOLUME TYPE | PRIMARY DESTINATION INFORMATION | CAPACITY | OPERATING STATE |
|---|---|---|---|---|---|---|
| 1 | 9980V001 | V1 | PRIMARY | NONE | 10 | UNEXECUTED |
| 2 | 9980V001 | V2 | SECONDARY/ PRIMARY | V1 | 10 | UNEXECUTED |
| 3 | 9980V001 | V3 | SECONDARY/ | V1 | 10 | IN EXECUTION |
| 4 | 9980V001 | V4 | SECONDARY/ | V2 | 10 | COMPLETED |
| 5 | 9980V001 | V5 | SECONDARY/ | V2 | 10 | IN EXECUTION |

US 7,596,658 B2

METHOD FOR EXPANDING CAPACITY OF REPLICATION VOLUME

CROSS-REFERENCE TO PRIOR APPLICATION

This application relates to and claims priority from Japanese Patent Application No. 2006-152086, filed on May 31, 2006 the entire disclosure of which is incorporated herein by reference.

BACKGROUND OF THE INVENTION

1. Field of the Invention

This invention relates to technology of expanding the capacity of a logical volume.

2. Description of the Related Art

As a method for expanding the capacity of a logical volume, there is known a method disclosed in, for example, Japanese Patent Application Laid-Open No. 2003-15915. In this unexamined application discloses a method in which when the volume capacity is insufficient due to writing from a host computer, a storage system dynamically adds an unused storage area of a physical disk to a segment of a logical volume.

A logical volume used in a host computer is made redundant in order to enhance the safety of the data. Hereinafter, a logical volume used in a host computer is referred to as "original volume" and a logical volume obtained from a redundant original volume is referred to as "replication volume". There is a case in which a replication volume exists in a storage system where an original volume exists, and there is also a case in which a replication volume exists in a different storage system. In the former case, the replication volume is a copy obtained in the storage system, and in the latter case the replication volume is a so-called remote copy created from a storage system to other storage system.

By associating a replication volume with an original volume, a logical volume cascade ("volume cascade" hereinafter) is created. By associating a replication volume to other replication volume, a longer volume cascade is created, making the original volume redundant. After new data is written to an original volume, the data is copied to the replication volume associated with the original volume. If other replication volume is associated with this replication volume, the data which is copied to this replication volume is further copied to the abovementioned other replication volume. In this manner, the data is copied from an upstream logical volume to a downstream logical volume in a volume cascade.

Therefore, when, for example, the capacity of the upstream logical volume is expanded, it is necessary to expand the capacity of the downstream logical volume so that all data items stored in the upstream logical volume in the downstream logical volume as well. However, a technology for expanding the capacity of a downstream logical volume in response to the expansion of the capacity of the upstream logical volume is not known in a prior art.

SUMMARY OF THE INVENTION

Therefore, an object of the present invention is to enable automatic expansion of the capacity of a downstream logical volume in response to the expansion of the capacity of an upstream logical volume.

Other object of the present invention will be clear from the following descriptions.

A management computer according to the present invention is a computer for managing a group of storage systems comprising a plurality of logical volumes. The storage system group comprises one or more storage systems. The plurality of logical volumes contain two or more logical volumes constituting a volume cascade. The volume cascade is a group of volumes in which an original volume, which is an uppermost-stream logical volume, is associated with, in the form of a cascade, a replication volume, which is a logical volume of a lower stream than the uppermost-stream logical volume. The storage system group comprises: one or more volume cascades; a copy section which copies data stored in the original volume to the downstream replication volume in accordance with a volume cascade to which the original volume belongs; and a capacity expanding section which receives a capacity expansion instruction and expands the capacity of a logical volume which is designated by the capacity expansion instruction. The management computer comprises: a cascade configuration storage section which stores volume cascade configuration information which is information related to the configuration of the volume cascade; an expansion target volume determination section which determines any logical volume of the plurality of logical volumes as a target of expansion; a cascade configuration specifying section which specifies, from the volume cascade configuration information, other logical volume of the volume cascade to which the expansion target logical volume belongs; and a capacity expansion control section which transmits, to the storage system group, a capacity expansion instruction which designates two or more target volumes and the capacity obtained after expanding each of the two or more target volumes, the two or more target volumes constituting a target volume cascade comprising the expansion target logical volume and the specified other logical volume. Designation of the capacity obtained after expansion may be, for example, either designation of a value indicating the capacity obtained after expansion or designation of a value indicating the capacity to be added to a current capacity.

In a first embodiment, the capacity expansion control section, under the capacity expansion instruction, can set the capacity obtained after expanding a downstream target volume to the capacity obtained after expansion or more, which is designated for a target volume which is located proximate and upper stream with respect to the downstream target volume.

In a second embodiment, the management computer can further has a capacity upper limit storage section which stores an upper limit of the capacity of each of a plurality of areas present in the storage system group. At least one logical volume of the plurality of logical volumes belongs to each of the plurality of areas. When the upper limit of the capacity of at least one target area is exceeded by expanding the two or more target volumes, the capacity expansion control section is capable of searching for, on the basis of the capacity obtained after expanding each of the two or more target volumes and the upper limits of the capacities of target areas to which the target volumes belong respectively out of the plurality of areas, other area whose upper limit of the capacity is not exceeded even when adding, of the plurality of areas, the capacity which is obtained after expanding the target volumes belonging to the target areas whose upper limits of the capacities are exceeded, and rearranging the target volumes to the searched other area.

In a third embodiment according to the second embodiment, the storage system group comprises a plurality of storage systems. Each of the plurality of areas is the storage system.

In a fourth embodiment according to the second embodiment, a plurality of RAID groups are set in the storage system group. Each of the plurality of RAID groups is constituted by two or more physical storage devices of a plurality of physical storage devices provided in the storage system group. Each logical volume is a logical storage device prepared based on a physical storage resource provided by each RAID group. Each of the plurality of areas is the RAID group.

In a fifth embodiment according to the second embodiment, the capacity expansion control section can preferentially set the target volumes of the lower streams of the target volume cascade as targets of rearrangement.

In a sixth embodiment according to the second embodiment, when the other area cannot be found, the capacity expansion control section can remove a replication volume, which is a target of rearrangement, from the target volume cascade.

In a seventh embodiment according to the sixth embodiment, the capacity expansion control section can remove the replication volume from the target volume cascade when an automatic removal permission, which is information indicating that automatic removal of the replication volume can be performed for the target volume cascade, is set beforehand, and can stop expanding the capacity of each of the target volumes configuring the target volume cascade, when the automatic removal permission is not set beforehand.

In an eighth embodiment according to the sixth embodiment, the capacity expansion control section can preferentially set the target volumes of the lower streams of the target volume cascade as targets of removal.

In a ninth embodiment according to the sixth embodiment, since the original volume belonging to the target volume cascade is also an original volume of other volume cascade of the one or more volume cascades, two or more target volume cascades exist, and, when at least one replication volume of at least one of the two or more target volume cascades exists in a storage system of the storage system group, which is different from a storage system in which the original volume exists, the capacity expansion control section can preferentially remove at least one replication volume of a target volume cascade of the two or more target volume cascades, in which replication volumes do not exist in the storage system which is different from the storage system in which the original volume exists.

In a tenth embodiment, the capacity expansion control section performs nonsimultaneous capacity expansion processing comprising the steps of transmitting, to the storage system group, a capacity expansion instruction for expanding the capacity of one target volume of two or more target volumes configuring the target volume cascade, and transmitting a capacity expansion instruction for expanding the capacity of other target volume, after receiving a completion of capacity expansion from the storage system group.

In an eleventh embodiment, the capacity expansion control section performs simultaneous capacity expansion processing comprising the step of transmitting, to the storage system group, a capacity expansion instruction in units of target volumes having a predetermined attribute of the two or more target volumes configuring the target volume cascade.

In a twelfth embodiment according to the eleventh embodiment, the predetermined attribute is a type of the target volume, which includes as the type at least a primary volume indicating that the target volume is the uppermost-stream volume, a secondary volume indicating that the target volume is the lowest-stream volume, and, when the target volume cascade is constituted from three or more target volumes, a secondary/primary volume indicating an intermediate target volume present between the primary volume and the secondary volume.

In a thirteenth embodiment, the capacity expansion control section can select either the nonsimultaneous capacity expansion processing or the simultaneous capacity expansion processing and perform the selected processing. In the nonsimultaneous capacity expansion processing, for the two or more target volumes configuring the target volume cascade, a capacity expansion instruction for expanding the capacity of one target volume can be transmitted to the storage system group, and after a completion of capacity expansion is received from the storage system group a capacity expansion instruction for expanding the capacity of other target volume can be transmitted. In the simultaneous capacity expansion processing, a capacity expansion instruction can be transmitted to the storage system group in units of target volumes having a predetermined attribute in the two or more target volumes configuring the target volume cascade.

In a fourteenth embodiment, the capacity expansion control section can select the nonsimultaneous capacity expansion processing in the case of at least one of the following (A) through (C):

(A) the number of target volumes is small;
(B) the number of storage systems is small; and
(C) the loads of the storage systems are suppressed, and can select the simultaneous capacity expansion processing in the case of at least one of the following (a) through (c):

(a) the number of target volumes is large;
(b) the number of storage systems is large; and
(c) the time required in capacity expansion is suppressed.

In a fifteenth embodiment, the capacity expansion control section can preferentially transmit a capacity expansion instruction first to a target volume of the lower stream out of the two or more target volumes.

In a sixteenth embodiment, the capacity expansion control section can preferentially transmit a capacity expansion instruction first to a target volume of the upper stream out of the two or more target volumes.

In a seventeenth embodiment, the expansion target volume determination section can set a logical volume whose usage rate exceeds a threshold, as the expansion target. The usage rate is the percentage of the used capacity with respect to the capacity of the logical volume.

Each section described above may be used as means. The storage section can be used as, for example, a storage area prepared in the storage resource (memory or a disk, for example). The other sections can be realized by a hardware (a circuit, for example), a computer program, or a combination thereof (for example, one or a plurality of CPUs which reads and executes computer programs). Each computer program can be read from the storage resource (memory, for example) provided in a computer machine. The computer programs can be installed in the storage resource via a storage medium such as a CD-ROM or DVD (Digital Versatile Disk), or can be downloaded to the storage resource via a communication network such as the Internet or LAN.

BRIEF DESCRIPTION OF THE DRAWINGS

FIG. 3 shows a configuration example of a logical region management table 139;

FIG. 4 shows a configuration example of a volume management table 141;

FIG. 5 shows a configuration example of a replication definition table 145;

FIG. 6 shows a configuration example of an expansion target replication volume table 147;

FIG. 7 shows a configuration example of a volume expansion/rearrangement relation table 143;

DESCRIPTION OF THE PREFERRED EMBODIMENTS

Figure 1:
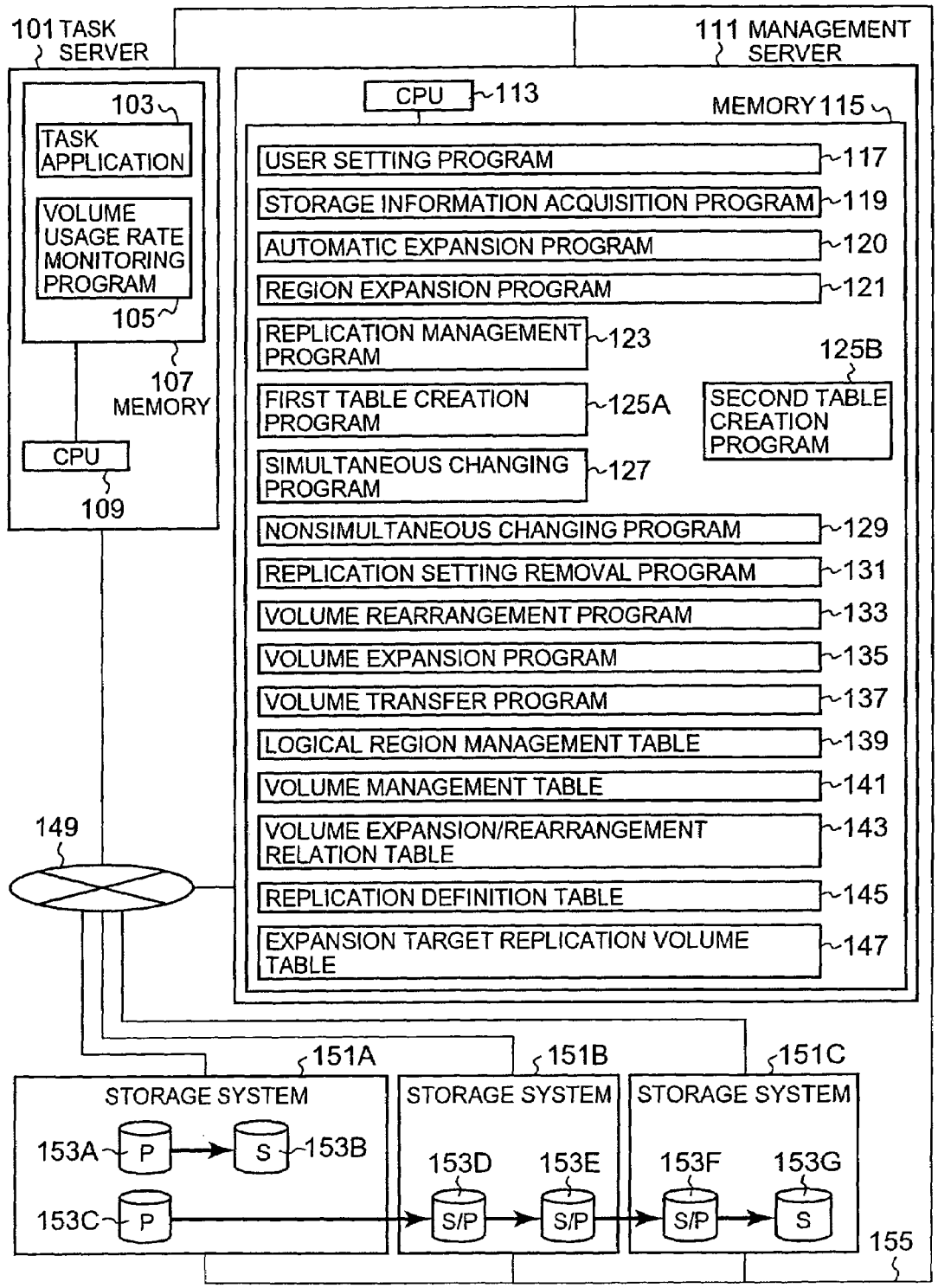
FIG. 1 is a figure showing a configuration example of a computer system according to an embodiment of the present invention.

FIG. 1 is a figure showing a configuration example of a computer system according to an embodiment of the present invention. It should be noted in the following explanation that numbers (153, for example) are used to describe like elements, and a combination of a number and a symbol (153A, for example) is used to particularly distinguish the elements.

In this computer system, one or a plurality of (one, for example) task servers 101, a management server 111, and one or a plurality of (three, for example) storage systems 151A, 151B, and 151C are connected to each of a first communication network 149 and a second communication network 155. The types of the communication networks 149 and 155 are not particularly limited. For example, a SAN (Storage Area Network) can be employed as the first communication network 149 and a LAN (Local Area Network) can be employed as the second communication network 155.

The task server 101 is a type of a computer and executes a predetermined task. The task server 101 comprises a CPU 109 and memory (or other type of storage resource) 107. The memory 107 stores a computer program 103 for executing a predetermined task ("task application" hereinafter) and a computer program 105 for monitoring the usage rate of a predetermined logical volume ("volume usage rate monitoring program" hereinafter). The CPU 109 reads out and executes the computer programs stored in the memory 107. Hereinafter, when a program is a subject, the processing is carried by the CPU which actually executes this program. The task application 103 accesses an original volume 153A and/or 153C (reads or writes data, for example) A target of monitoring for the volume usage rate monitoring program 105 is, for example, a logical volume which is an access destination of the task application 103. The volume usage rate monitoring program 105 may be provided in the management server 111 in place of the task server 101.

The management server 111 is a type of a computer and manages the task server 101 and the storage systems 151A through 151C. The management server 111 comprises a CPU 113 and memory (or other type of storage resource) 115. The memory 115 stores various data and computer programs. Examples of the data include a logical region management table 139, a volume management table 141, a volume expansion/rearrangement relation table 143, a replication definition table 145, and an expansion target replication volume table 147. Examples of the computer programs include a user setting program 117, a storage information acquisition program 119, an automatic expansion program 120, a region expansion program 121, a replication management program 123, a first table creation program 125A, a second table creation program 125B, a simultaneous changing program 127, a nonsimultaneous changing program 129, a replication setting removal program 131, a volume rearrangement program 133, a volume expansion program 135, and a volume transfer program 137. These data and computer programs are described in detail hereinafter.

Each of the storage systems 151 comprises a storage control section which is not shown, and one or a plurality of logical volumes 153. A volume cascade exists in a single storage system 151 or extends across a plurality of storage systems 151. Specifically, for example, a volume cascade constituted from the original volume 153A and one application volume 153B exists in the storage system 151A. Further, for example, other volume cascade constituted from the original volume 153C and a plurality of replication volumes 153D, 153E, 153F, and 153G extends across the plurality of storage systems 153A through 153C.

In the volume cascade comprises one or a plurality of continuous volume pairs consisting of a pair of logical volumes. Of the volume pair, one logical volume is a primary (copy source) logical volume (illustrated as "P") and the other one is a secondary (copy destination) logical volume (illustrated as "S"). Data is copied from the primary logical volume ("PVOL" hereinafter) to the secondary logical volume ("SVOL" hereinafter). When the volume pairs are provided successively, successive SVOLs of the volume pairs and successive PVOLs of the volume pairs configure a common logical volume (illustrated as "S/P"). In each volume cascade, copying is performed in the flow indicated by the arrows in the figure. It should be noted that, in the volume cascade, data may be read from the PVOL and then copied to the SVOL, or data written in the PVOL may be held in a memory inside a storage control section and then copied from the memory to the SVOL.

Figure 2:
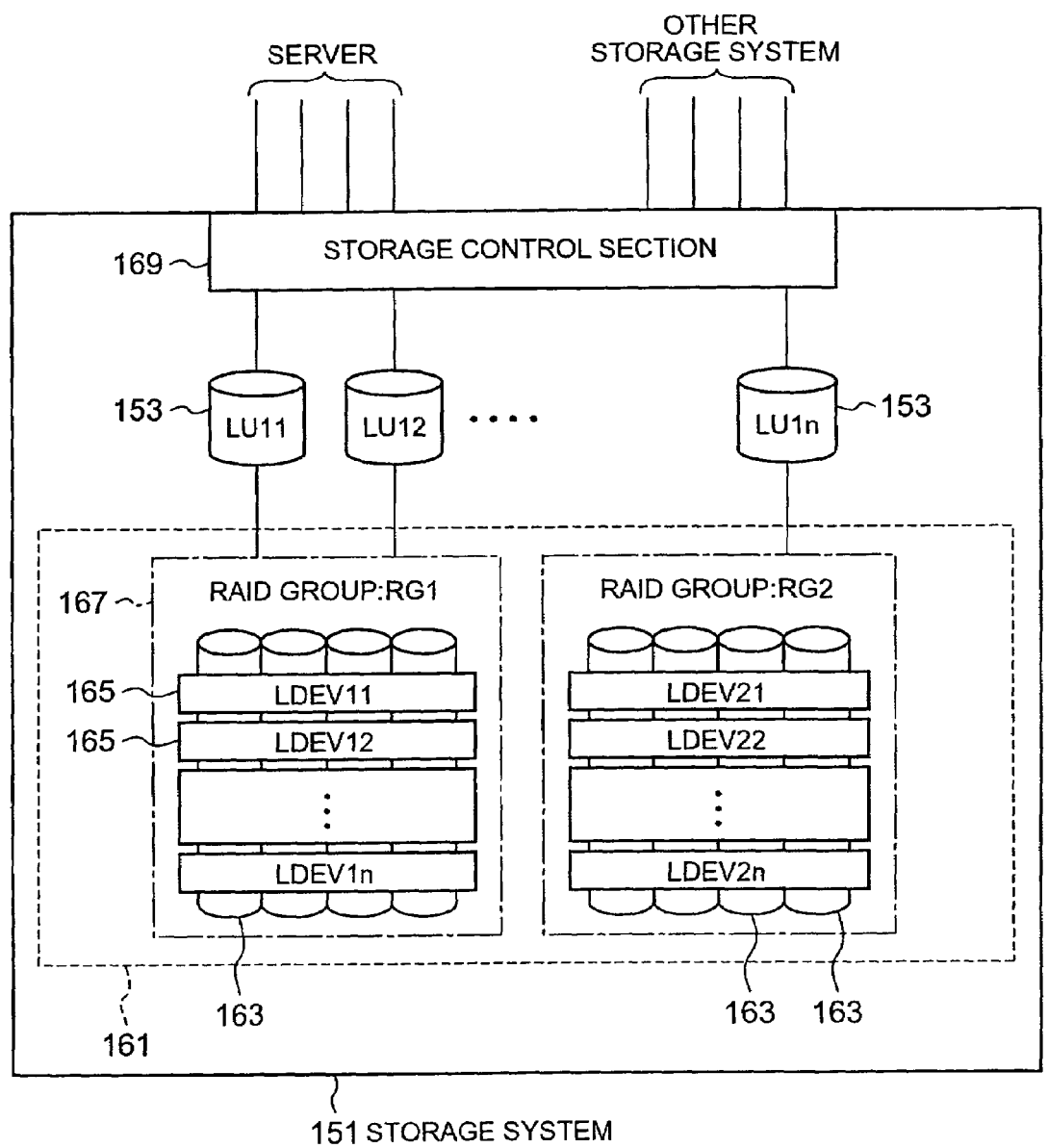
FIG. 2 shows a configuration example of a storage system 151.

FIG. 2 shows a configuration example of the storage system 151.

The storage system 151 comprises a storage control section 169, the plurality of logical volumes 153, and a storage section 161.

The storage control section 169 is a circuit board comprising, for example, a CPU, memory, and the like. The storage control section 169 can control a communication with the task server 101 and a communication with other storage system 151.

The storage section 161 comprises a plurality of storage devices 163. In the plurality of storage devices 163, the same type of storage devices or different types of storage devices may exist. As the storage devices 163, hard disk devices, memory devices (flash memory, for example), optical disk deices, magneto-optical disk devices, magnetic tape devices, and various other devices capable of writing data can be used.

In the storage section 161, a plurality of RAID groups (sometimes referred to as "parity groups" or "array groups") 167 can be configured. Each storage group 167 is constituted from two or more storage devices 163. By logical dividing a physical storage resource provided by these two or more storage devices 163, a plurality of logical regions 165 can be set. "Logical region" described here means a region of the physical storage resource. One or plurality of logical regions 165 are allocated to a single logical volume 153.

FIG. 3 shows a configuration example of the logical region management table 139.

The logical region management table 139 is a table for managing logical regions. This table 139 can be created by for example, the storage information acquisition program 119 acquiring storage region management information (not shown) held in each of the storage systems 151A through 151C. This table 139 can be created according to each storage system. In this table 139, "logical region-ID" (ID of a logical region), "RG-ID" (ID of a RAID group in which the logical region exists), "capacity" (the storage capacity of the logical region), and "allocation flag" are recorded for each logical region. "Allocation flag" is, for example, "1" when a logical region corresponding to a certain allocation flag is already allocated, and is, for example, "0" when the logical region is not yet allocated.

FIG. 4 shows a configuration example of the volume management table 141.

The volume management table 141 is a table for managing logical volumes. This table 141 can be prepared according to, for example, each storage system 151. In this table 141, the relationship between logical volumes and logical regions. Specifically, for example, there are "LU-ID" (ID of a logical volume, i.e. LUN (logical unit number)), "logical region-ID" (IDs of one or a plurality of logical regions allocated to the logical volume), "storage system ID" (ID of a storage system in which the logical volume exists), "expansion determination usage rate", "minimum increased capacity", "expansion method", "rearrangement method", and "replication automatic removal setting", for each logical volume. The logical volume corresponding to the information registered in the table 141 is the original volume, and the information corresponding to the replication volume is not registered. "Expansion determination usage rate" means the usage rate of the original volume and is a value used as the standard for judging whether capacity expansion is to be executed or not. "Minimum increased capacity" is a value indicating the minimum capacity to be increased when executing capacity expansion. "Expansion method" is a method of capacity expansion, and there are two type thereof, i.e. nonsimultaneous and simultaneous expansion methods (these methods are described hereinafter). "Rearrangement method" means a method for updating the arrangement of the logical volumes configuring the volume cascade, and there are two types thereof, i.e. a method for performing capacity expansion after updating the arrangement of the logical volumes and a method for updating the arrangement of the logical volumes after performing capacity expansion (there methods are described hereinafter). "Replication automatic removal setting" means setting for determining whether to automatically remove a replication volume configuring the cascade volume.

Setting of the logical volumes can be performed by means of the management server 111. Specifically, for example, a manager defines a logical volume and selects from the logical region management table 139 a logical region for allocating this logical volume. A set of the information of this defined logical volume (LU-ID, for example) and the information of the logical region for allocating this logical volume (logical region ID, for example) is sent to the storage system 151, whereby the relationship between the logical volume and the logical region is defined in the storage system 151. Moreover, the expansion determination usage rate, minimum increased capacity, expansion method, rearrangement method, and replication automatic removal setting can be inputted by the manager. When these information items are not inputted, a predetermined code ("N/A", for example) is registered. The logical volume inputted with this predetermined code is not recognized as a target of automatic expansion.

FIG. 5 shows a configuration example of the replication definition table 145.

The replication definition table 145 shows a definition of replication at the present moment (in other words, a definition of an existing volume cascade). In the replication definition table 145, there are recorded, for example, "ID" (ID which uniquely indicating the information (row) in the table 145), "storage ID", "LU-ID" (ID of a logical volume), "volume information" (information indicating that the logical volume is any of "primary", "primary/secondary", and "secondary"), "primary destination information" (information related to a proximate and upstream logical volume with respect to the logical volume (primary destination) (for example, storage system ID and primary destination logical volume ID)), and "capacity" (current capacity of the logical volume). If the primary destination information is registered as "none", it means that the logical volume corresponding to this information is the original volume.

FIG. 6 shows a configuration example of the expansion target replication volume table 147.

The expansion target replication volume table 147 shows a state of each logical volume configuring the volume cascade. New information items which are not shown in the replication definition table 145 are "hierarchy level" and "operating state". "Hierarchy level" is the number of logical volumes before a corresponding volume reaches "primary". In the example shown in FIG. 1, the hierarchy level for, for example, the replication volume 153E is "2". This is because the replication volume 153E is the second replication volume when the original volume 153C is the $0^{th}$ volume. "Operating state" is an item which is referred to when the expansion method is the simultaneous changing method, and shows a progress of capacity expansion. As an initial value for "operating state", "unexecuted" is inputted, meaning that capacity expansion is not yet processed, "in execution" is inputted if capacity expansion is being performed, or "completed" is inputted if capacity expansion is completed.

FIG. 7 shows a configuration example of the volume expansion/rearrangement relation table 143.

The volume expansion/rearrangement relation table 143 shows responses before and after execution of expansion/rearrangement of a replication volume which is a target of capacity expansion and/or rearrangement ("expansion/rearrangement" hereinafter). Specifically, for example, the storage system ID, LU-ID, and logical region ID are recorded for the response before execution and the response after execution.

Hereinafter, an outline of the processing performed in the present embodiment is described with reference to FIG. 8 through FIG. 10.

Figure 8:
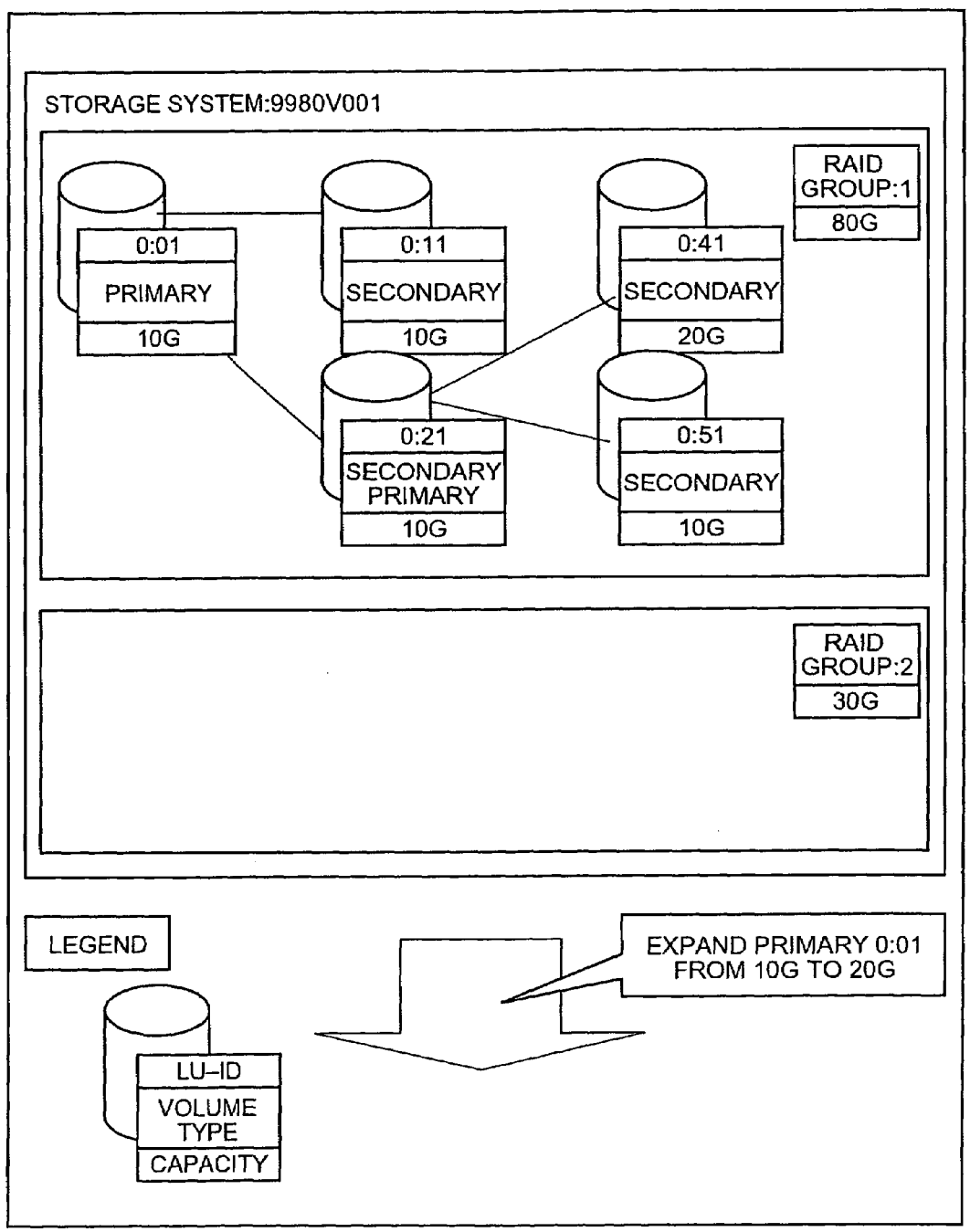
FIG. 8 shows a configuration example of a volume cascade existing in a storage system 151A before volume capacity expansion is performed.

FIG. 8 shows a configuration example of a volume cascade existing in the storage system 151A before volume capacity expansion is performed.

A RAID group 1 in which the upper limit of the capacity thereof is, for example, 80 G (giga byte) and a RAID group 2 in which the upper limit of the capacity thereof is 30 G are present in the storage system 151A.

Further, three volume cascades are present in the RAID group 1. To describe each of the volume cascades by using LU-ID/volume type/capacity, starting from the upstream side, the first volume cascade is configured with "0:01/Primary/10 G" and "0:11/Secondary/10 G". The second volume cascade is configured with "0:01/Primary/10 G", "0:21/Secondary-Primary/10 G", and "0:41/Secondary/20 G". The third volume cascade is configured with "0:01/Primary/10 G", "0:21/Secondary-Primary/10 G", and "0:51/Secondary/10 G".

On the other hand, logical volumes are not present in the RAID group 2.

According to this situation, since the sum of the capacities of the logical volumes existing in the RAID group 1 is 60 G, there is an allowance of 80 G-60 G=20 G.

In this situation, as shown in FIG. 8, suppose that the management server 111 expands 0:01/Primary/10 G to 20 G. Specifically, for example, suppose that the management server 111 receives from the task server 101 the usage rate of the original volume thereof as a result of monitoring 0:01/Primary/10 G, and that the management server 111 expands the amount of a minimum increased capacity corresponding to this original volume since this usage rate exceeds the expansion determination usage rate of this original volume (see FIG. 4). Alternatively, for example, suppose that the management server 111 expands the 0:01/Primary/10 G to 20 G in response to an instruction from the manager instructing expansion of it. It should be noted that the expansion determination usage rate can be set by, for example, the manager using a GUI displayed in the management server 111.

Figure 9:
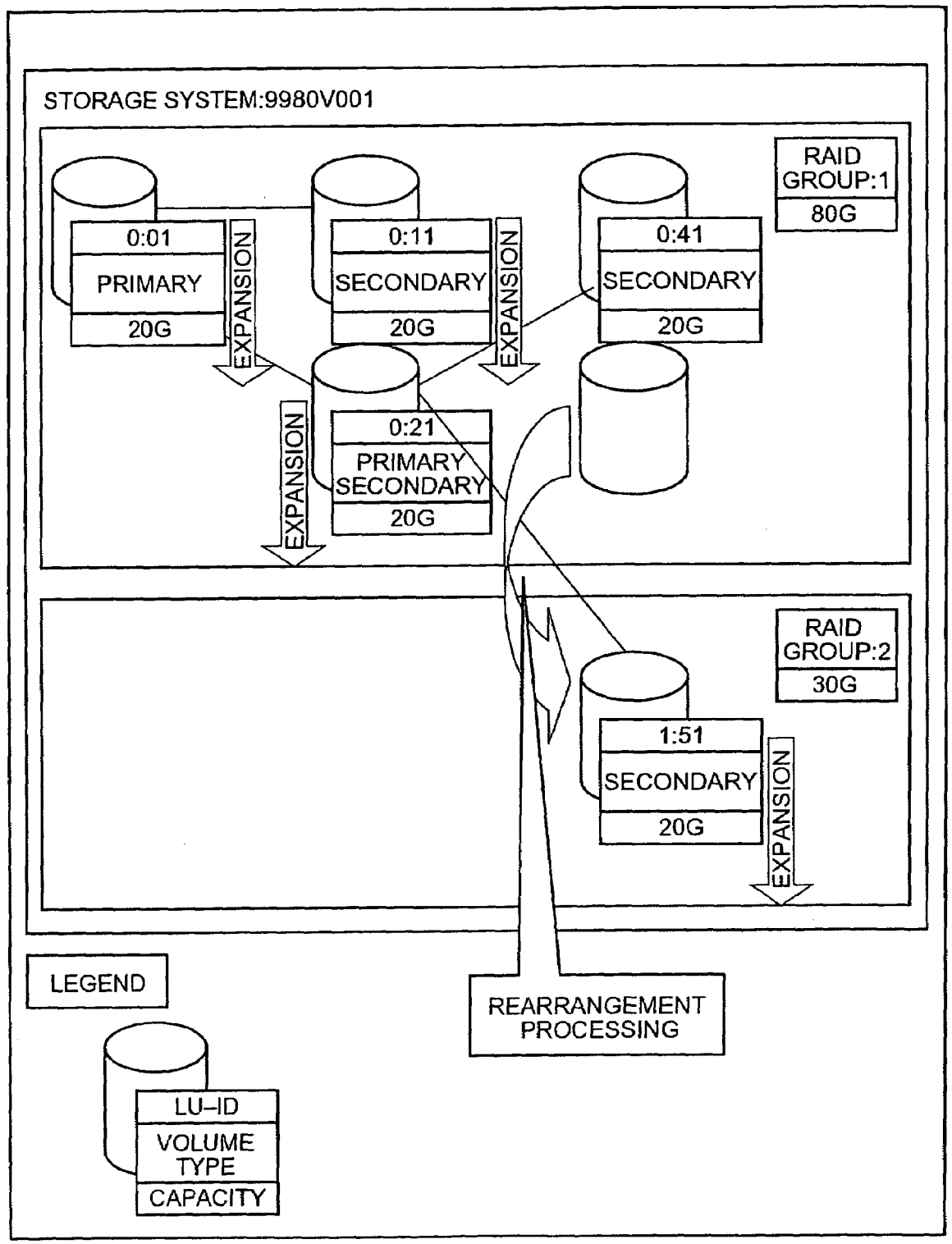
FIG. 9 shows an outline of an example of processing for expanding 0:01/Primary/10 G to 20 G in FIG. 8.

FIG. 9 shows an outline of an example of processing for expanding the 0:01/Primary/10 G to 20 G in FIG. 8.

The management server 111 refers to the replication definition table 145, specifies a replication volume for the case in which the 0:01/Primary/10 G is taken as an original volume, and registers the information on the specified replication volume to the expansion target replication volume table 147.

Then, when the management server 111 expands the 0:01/Primary/10 G to 20 G, the management server 111 sets the capacity of a logical volume lower than this original volume, i.e. the capacity of the replication volume, to 20 G or higher. This process is performed in order to store all data, which is stored in the original volume obtained after capacity expansion, in the replication volume as well. According to the example shown in FIG. 9, the management server 111 attempts to set not only the original volume but also all replication volumes to 20 G. Specifically, the management server 111 attempts to set the capacity of each of the three replication volumes (LU-ID is 0:11, 0:21, and 0:51), which is less than 20 G, to 20 G.

Here, once the management server 111 sets the capacity of each of all logical volumes inside the RAID group 1 to 20 G, the sum of the capacities of the logical volumes become 10 G, hence it becomes possible to detect that the upper limit of the capacity of the RAID group 1 exceeds 80 G. In this case, the management server 111 changes the position of at least one logical volume to other RAID group 2 which can have 20 G logical volumes (rearrangement). Accordingly, even when expanding the capacity of the replication volume related to the original volume, the upper limit of the capacity of the RAID group 1 is not exceeded and the number of replication volumes existing in each volume cascade is not reduced.

It should be noted that a rearrangement target logical volume may be a replication volume or an original volume. In the case of a replication volume, it is considered preferable that a replication volume whose hierarchy level is the highest (i.e. farthest volume from an original volume) be the target of rearrangement. Although the number of logical volumes to be rearranged is arbitrary, a small number of logical volumes is considered preferable. A rearrangement destination is preferably inside a storage system in which original volumes exist, but if this storage system does not have a capacity which is not large enough for rearrangement, other storage system may be used. Furthermore, if the rearrangement target is an original volume, the management server 111 can form a path between the task server 101 and an original volume obtained after rearrangement (in other words, the management server 111 can connect the task server 101 to an original volume obtained after rearrangement).

Moreover, for the capacity expansion processing, for example, the management server 111 refers to the allocation flag of the logical region management table 139, whereby the management server 111 can specify, from unallocated logical regions existing in a desired RAID group, a logical region having a sufficient capacity for expansion, and execute the processing for allocating the specified logical region to the logical volume which is a target of expansion/rearrangement. The specified logical region may be one or plural as long as the total capacity is sufficient for expansion.

Moreover, when "possible" is set as the replication automatic removal setting in the original volume (see FIG. 4), the management server 111 may perform replication removal processing of FIG. 10, which is described hereinafter, instead of or in addition to the expansion/rearrangement processing shown in FIG. 8. Specifically, for example, the management server 111 may attempt rearrangement as much as possible and, when a capacity large enough for arranging expanded logical volumes does not exist, may perform the replication removal processing. When doing so, the management server 111 outputs a GUI for making an inquiry to the manager. When, as a result, receiving a response that the replication is removed, via the GUI, the management server 111 may perform the replication removal processing, or may directly perform the replication removal processing without making the inquiry to the manager. Specifically, for example, when "impossible" is set as the replication automatic removal setting, the management server 111 makes an inquiry to the manager as to whether to perform replication removal, but when "possible" is set, the management server 111 can perform the replication removal setting without making the inquiry to the manager. In the latter case, the management server 111 can display (in the form of a list, for example) the removed replication volumes (and/or a volume cascade).

Figure 10:
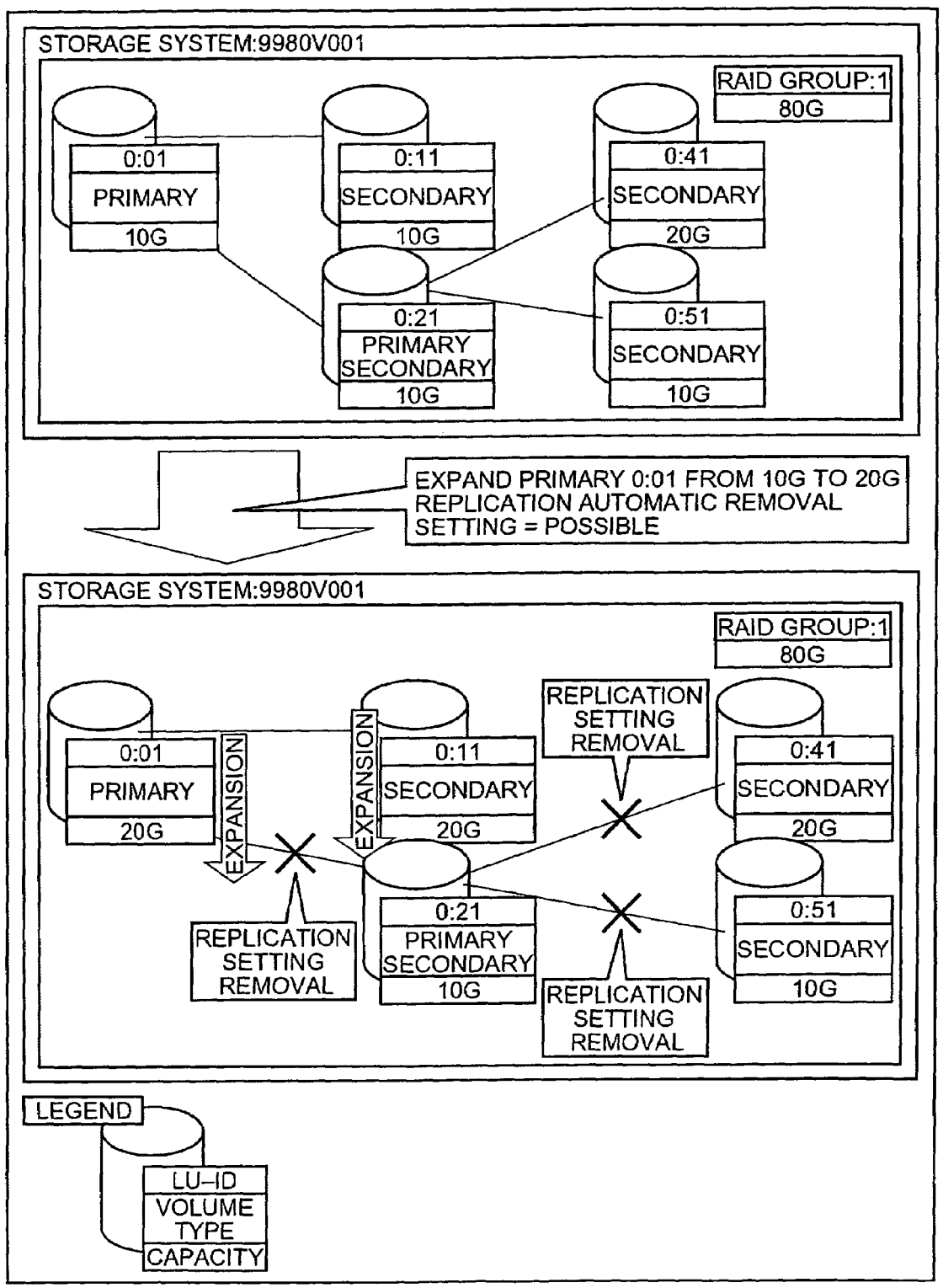
FIG. 10 shows an outline of replication removal processing.

FIG. 10 shows an outline of the replication removal processing.

For example, in the situation shown in FIG. 8, suppose that the management server 111 expands the 0:01/Primary/10 G to 20 G. In this case, suppose that "possible" is set as the replication automatic removal setting in this original volume.

As described above, in addition to the original volume, when all replication volumes are set to 20 G in the RAID group 1, the sum of the capacities of the logical volumes become 10 G, exceeding the upper limit of the capacity of the RAID group 1, which is 80 G.

In this case, since "possible" is set as the replication automatic removal setting in the original volume, the management server 111 performs the replication removal processing for removing at least one replication volume, whereby the upper limit of the capacity of the RAID group 1 is not exceeded even when expanding the capacity of at least one replication volume. In the replication removal processing, the management server 111, for example, eliminates the association of at least one replication volume with the volume cascade, and does not expand the capacity of this unassociated replication volume. Moreover, for example, the management server 111 deletes the information on a replication volume belonging to the volume cascade from the replication definition table 145.

Figure 13A:
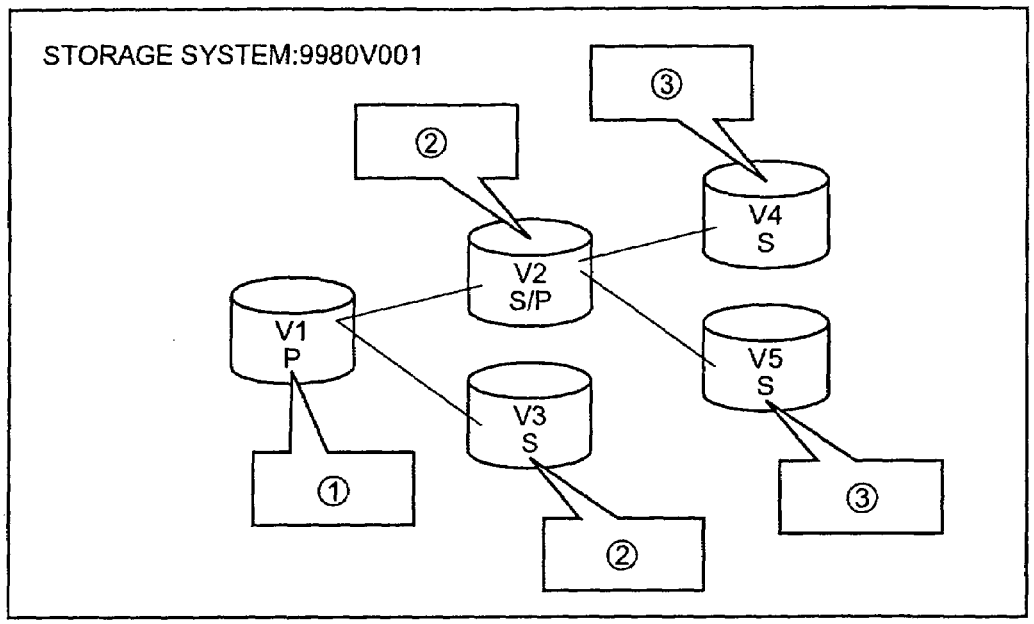
FIG. 13A is an explanatory diagram of an example of capacity expansion performed starting from an original volume when the simultaneous changing method is used.
Figure 13B:
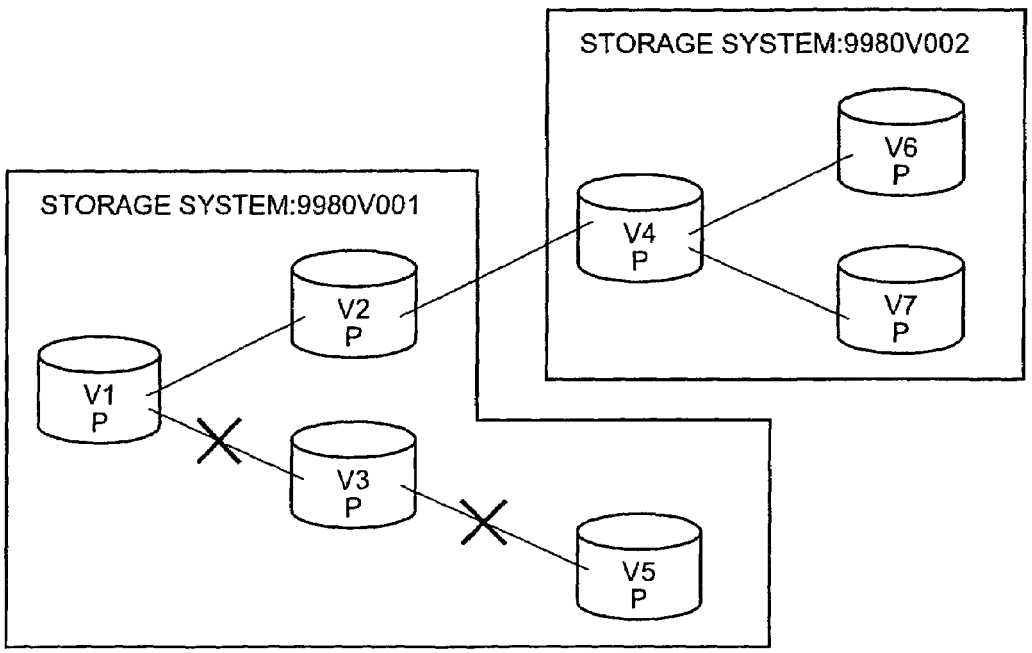
FIG. 13B shows an example in which a replication volume belonging to a volume cascade extending across other storage system is preferentially remained, and a replication volume belonging to a volume cascade inside one storage system is preferentially removed.

It should be noted in FIG. 10 that the replication volumes belonging to the abovementioned second and third volume cascades are removed, but the first volume cascade may be removed. Further, all replication volumes belonging to the volume cascades may be removed, or replication volumes with high hierarchy levels may be preferentially removed. When it is necessary to remove either a replication volume which belongs to the volume cascade extending across other storage system or a replication volume belonging to a volume cascade inside a single storage system, the replication volume which belongs to the volume cascade extending across other storage system may be remained preferentially, as shown in FIG. 13B. Accordingly, it becomes possible to cope with disaster recovery as much as possible. Moreover, out of a plurality of volume cascades inside a single storage system, a replication volume belonging to a long volume cascade may be preferentially remained, instead of remaining a replication volume belonging to a short volume cascade. Meanwhile, out of the plurality of volume cascades inside a single storage system, a replication volume belonging to a short volume cascade may be preferentially remained, instead of remaining a replication volume belonging to a long volume cascade.

As described above, in the present embodiment there are two types of capacity expansion methods: nonsimultaneous changing method and simultaneous changing method. Hereinafter, each of the expansion methods is described.

Figures 11A, 11B:
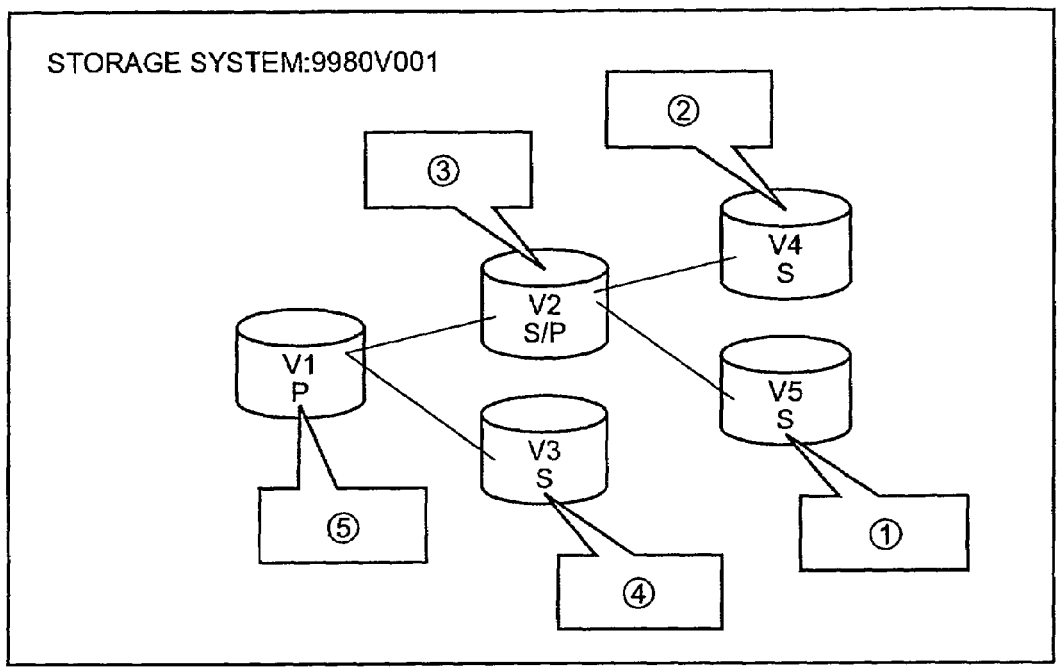
FIG. 11A is an explanatory diagram showing capacity expansion performed by means of a nonsimultaneous changing method.
FIG. 11B shows an expansion target replication volume table when capacity expansion of FIG. 11A is performed.

FIG. 11A is an explanatory diagram showing capacity expansion performed by means of the nonsimultaneous changing method. FIG. 11B shows an expansion target replication volume table when capacity expansion of FIG. 11A is performed.

The nonsimultaneous changing method is a method for expanding an expansion target replication volume one by one. The nonsimultaneous changing method is executed when designated in the volume management table 141 (see FIG. 4), but whether to perform the nonsimultaneous changing method or the simultaneous changing method may be selected by a predetermined computer program such as the replication management program 123. Specifically, for example, the replication management program 123 can select the nonsimultaneous changing method in the case of at least one of the following (A) through (C): (A) the number of rows in the expansion target replication volume table 147 (in other words, the number of expansion target replication volumes) is small (less than a first threshold, for example); (B) the number of storage systems is small (less than a second threshold, for example); and (C) it is not desired to place a burden on the storage systems (for example, the burden needs to be suppressed to a predetermined amount).

The numbers shown inside the balloons in FIG. 11A show an example of the order of expansion. As can be understood from this order, the replication volumes are subjected to capacity expansion one by one. At this moment, according to the example shown in the figure, capacity expansion is performed starting from a replication volume which is the farthest from the original volume (in other words, starting from a replication volume whose hierarchy level is the highest). Such capacity expansion performed in this order is employed when, for example, the computer system of the present embodiment is in operation. The reason is that the capacity of an SVOL needs to be equal to or more than the capacity of a PVOL in each volume pair in a volume cascade as described above, and that, if expansion is not performed starting from the farther replication volume, adherence to the relationship where SVOL capacity$\geq$PVOL capacity becomes impossible in accordance with the capacity of a free logical region existing in the RAID group (or storage system). To describe concretely using the example shown in FIG. 11A, when V2 is expanded prior to V5, V2$\leq$V5 cannot be obtained in accordance with the capacity of a free logical region existing in the RAID group (or storage system).

Figures 12A, 12B:
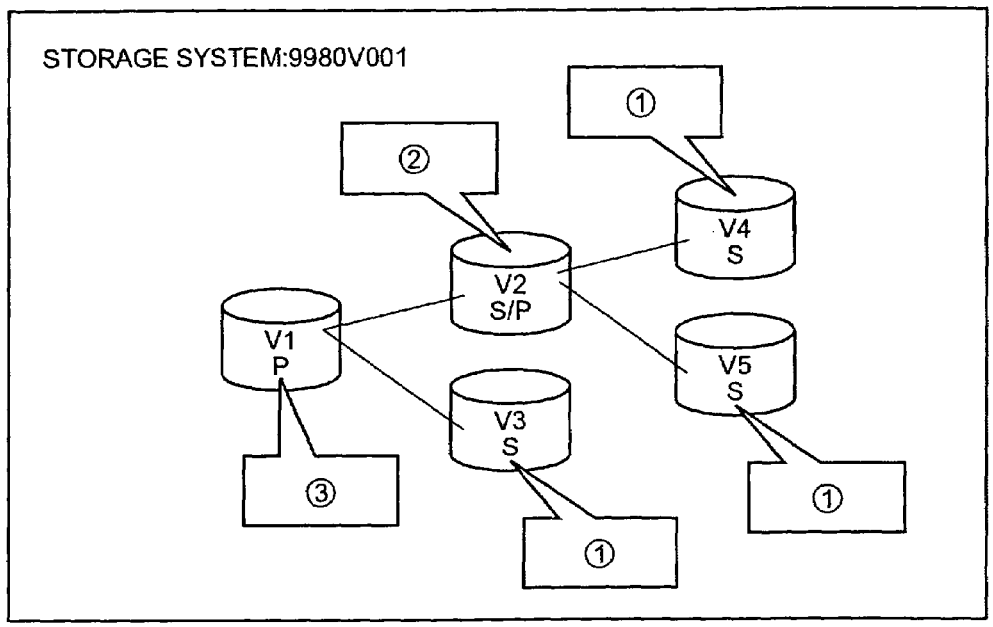
FIG. 12A is an explanatory diagram showing capacity expansion performed by means of a simultaneous changing method.
FIG. 12B shows an expansion target replication volume table when capacity expansion of FIG. 12A is performed.

FIG. 12A is an explanatory diagram showing capacity expansion performed by means of the simultaneous changing method. FIG. 12B shows an expansion target replication volume table when capacity expansion of FIG. 12A is performed.

The simultaneous changing method is a method for simultaneously expanding two or more replication volumes having the same attribute. According to the example shown in the figure, this attribute it the volume type. The simultaneous changing method is executed when designated in the volume management table 141 (see FIG. 4), but whether to perform the nonsimultaneous changing method or the simultaneous changing method may be selected by a predetermined computer program such as the replication management program 123. Specifically, for example, the replication management program 123 can select the nonsimultaneous changing method in the case of at least one of the following (a) through (c): (a) the number of rows in the expansion target replication volume table 147 (in other words, the number of expansion target replication volumes) is large (equal to or more than a first threshold, for example); (b) the number of storage systems is large (equal to or more than a second threshold, for example); and (c) it is desired to end expansion/rearrangement in a shorter period of time than the nonsimultaneous changing method at least.

The numbers shown inside the balloons in FIG. 12A show an example of the order of expansion. As can be understood from this order, two or more replication volumes having the same volume type (for example, V3, V4, and V5) are subjected to capacity expansion simultaneously. At this moment, when capacity expansion is started, the operating state is changed from "unexecuted" to "in execution", and when capacity expansion is ended the operating state is changed from "in execution" to "completed". Further, according to the example shown in the figure, capacity expansion is performed starting from a replication volume which is the farthest from the original volume (in other words, starting from a replication volume whose hierarchy level is the highest). Specifically, capacity expansion is started in the order of "Secondary", "Secondary/Primary", and "Primary". Such capacity expansion performed in this order is employed when, for example, the computer system of the present embodiment is in operation. The reason is same as the one mentioned above regarding the nonsimultaneous changing method.

It should be noted that, in the simultaneous changing method, capacity expansion may not necessarily be performed in units of volume types. For example, capacity expansion according to the simultaneous changing method may be performed in units of replication volumes whose distances from the original volume are same (in other words, the hierarchy levels are the same).

The above is the explanations of the nonsimultaneous changing method and the simultaneous changing method. It should be noted that capacity expansion using either one of the methods can be executed by means of a computer program. Further, in at least one of the nonsimultaneous changing method and simultaneous changing method, when the computer system is not in operation but stopped, it is not necessary to start from the farthest replication volume to perform expansion as described above, thus the capacity of the replication volumes may be expanded in any order. For example, the capacity may be expanded starting from the original volume (FIG. 13A is an explanatory diagram of an example of capacity expansion performed when the simultaneous changing method is used). Capacity expansion which is performed in this order is particularly effective when it is considered that the volumes closer to the original volume are important. In the case in which capacity expansion is performed using this method, if the capacity of the replication volumes whose hierarchy levels are low (i.e. replication volumes on the lower stream side) can no longer be expanded so as to satisfy the relationship where SVOL capacity≧PVOL capacity, such replication volumes can be removed.

The flows of processing performed by the computer system according to the embodiment are described hereinafter.

Figure 14:
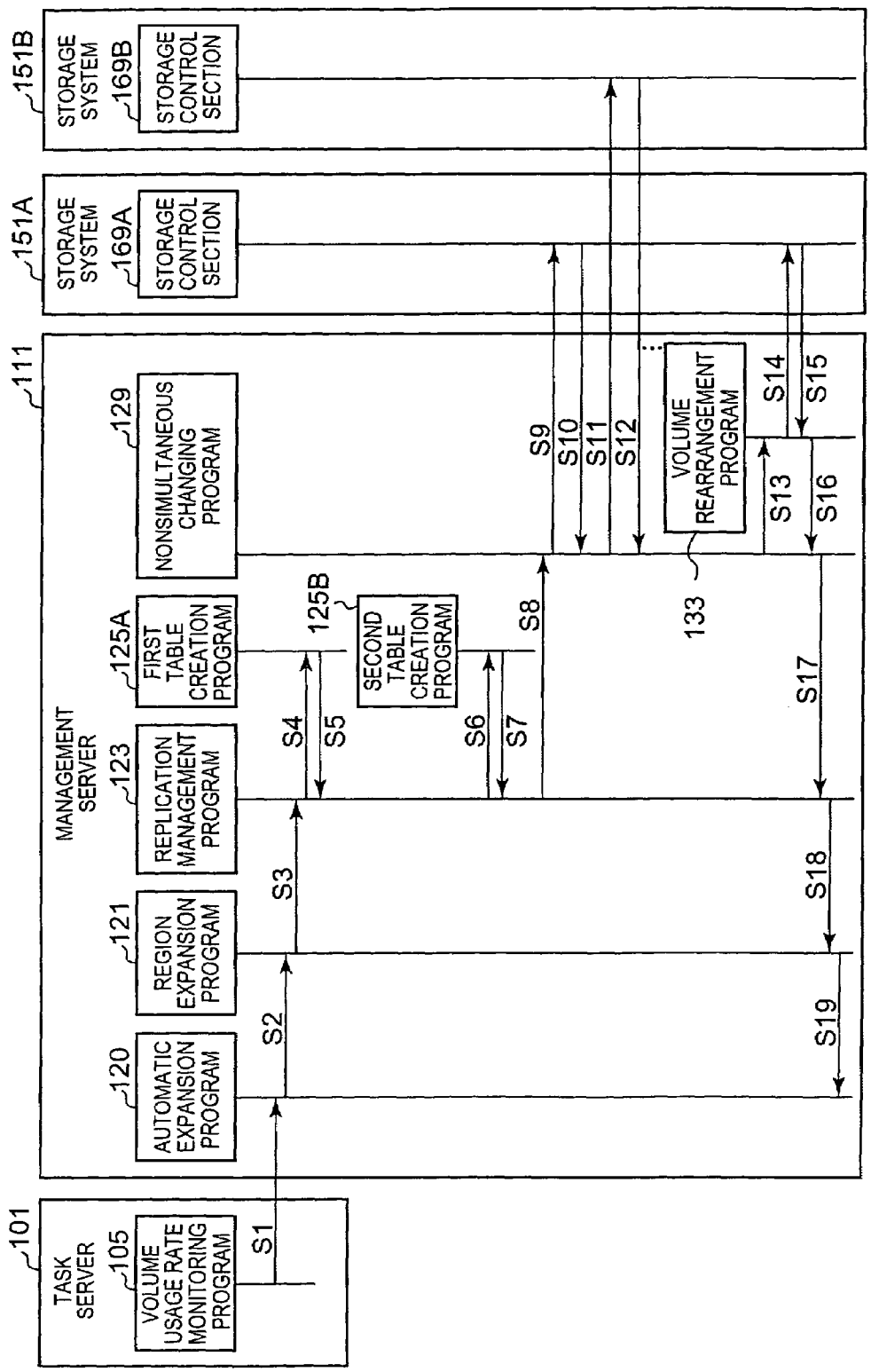
FIG. 14 shows an example of a flow of processing in the case in which capacity expansion is performed in accordance with the nonsimultaneous changing method.

FIG. 14 shows an example of a flow of processing in the case in which capacity expansion is performed in accordance with the nonsimultaneous changing method.

In the management server 111, the storage information acquisition program 119 is executed beforehand, and the information managed by the storage system is acquired, whereby the logical region management table 139 and the volume management table 141 are created according to each storage system and stored in the memory 115.

The volume usage rate monitoring program 105 is executed in the task server 110. The volume usage rate monitoring program 105 acquires the usage rate of each volume (each volume used by the task application 103) inside the storage system 151A, and notifies the management server 111 of the acquired each usage rate (step S1).

The automatic expansion program 120 is constantly executed in the management server 111. The automatic expansion program 120 receives each usage rate (usage rate of each volume) from the task server 101, refers to the volume management table 141, compares each usage rate with each expansion determination usage rate, and specifies a volume whose usage rate exceeds the expansion determination usage rate. The automatic expansion program 120 executes the region expansion program 121 for this volume, and inputs the LU-ID of the expansion target volume and the capacity of expanded volume as input values (S2). The capacity of expanded volume is, for example, the minimum increased capacity itself or an amount obtained by adding the minimum increased capacity to the current capacity of the volume. The region expansion program 121 may be executed manually by the manager. In this case, the capacity of expanded volume can be inputted by the manager.

The region expansion program 121 refers to the replication definition table 145, and judges whether the volume corresponding to the inputted LU-ID is "primary" of the volume cascade (i.e. original volume). If the volume is "primary", the region expansion program 121 calls up the replication management program 123 (S3), and, if not, calls up the volume expansion program 135. In the latter case, since a replication volume does not exist in the expansion target volume, the capacity of an individual volume is expanded.

The replication management program 123 calls up the first table creation table 125A (S4) to create the expansion target replication volume table 147. When a completion of capacity expansion is received (S5), the replication management program 123 calls up the second table creation program 125B (S6) to create the volume expansion/rearrangement relation table 143. The replication management program 123 associates the volume information obtained after execution (after expansion/rearrangement) with the volume information obtained before execution, on the basis of the information registered in the expansion target replication volume table 147, and inputs the association to the volume expansion/ rearrangement relation table 143. When a completion of capacity expansion is received (S7), the replication management program 123 calls up the nonsimultaneous changing program 129 (S8), and executes capacity expansion, one volume at a time, in accordance with nonsimultaneous changing method on the basis of the information registered in the expansion target replication volume table 147.

The nonsimultaneous changing program 129 executes region expansion one volume at a time. FIG. 14 shows an example of the case in which capacity expansion is performed, starting from a volume closer the original volume. The nonsimultaneous changing program 129 issues a region expansion instruction (for example, an instruction including the LU-ID and a logical region ID to be newly allocated thereto) to the storage system 151A having the original volume (S9). A storage control section 169A of the storage system 151A adds a logical region to the original volume in accordance with the region expansion instruction, thereby performing capacity expansion, and, after completion of capacity expansion, reports the completion to the nonsimultaneous changing program 129 (S10). Thereafter, capacity expansion is performed one replication volume at a time in accordance with the same flow (S11, S12).

It should be noted that the nonsimultaneous changing program 129 calls up the volume rearrangement program 133 according to need (when, for example, the situation described with reference to FIG. 9 is detected) (S13) to execute rearrangement of the volumes. The volume rearrangement program 133 issues a rearrangement instruction (an instruction including the LU-ID obtained before execution, LU-ID obtained after execution, and logical region ID to be allocated to the LU-ID obtained after execution) to the storage control section 169A (S14). If rearranging the logical volume from the storage system 151A to the storage system 151B, the volume rearrangement program 133, for example, may issue the instruction of LU-ID of a rearrangement target volume to the storage control section 169A, thereby removing the volume, cause a storage control section 169B to construct an LU-ID of a volume obtained after execution, and allocate a desired logical region ID to the volume. When receiving a completion (S15), the volume rearrangement program 133 reports the completion to the nonsimultaneous changing program 129 (S16). The nonsimultaneous changing program 129 reports the completion to the replication management program 123 (S17). The replication management program 123 reports the completion to the region expansion program 121 (S18). The region expansion program 121 reports the completion to the automatic expansion program (S19).

Figure 15:
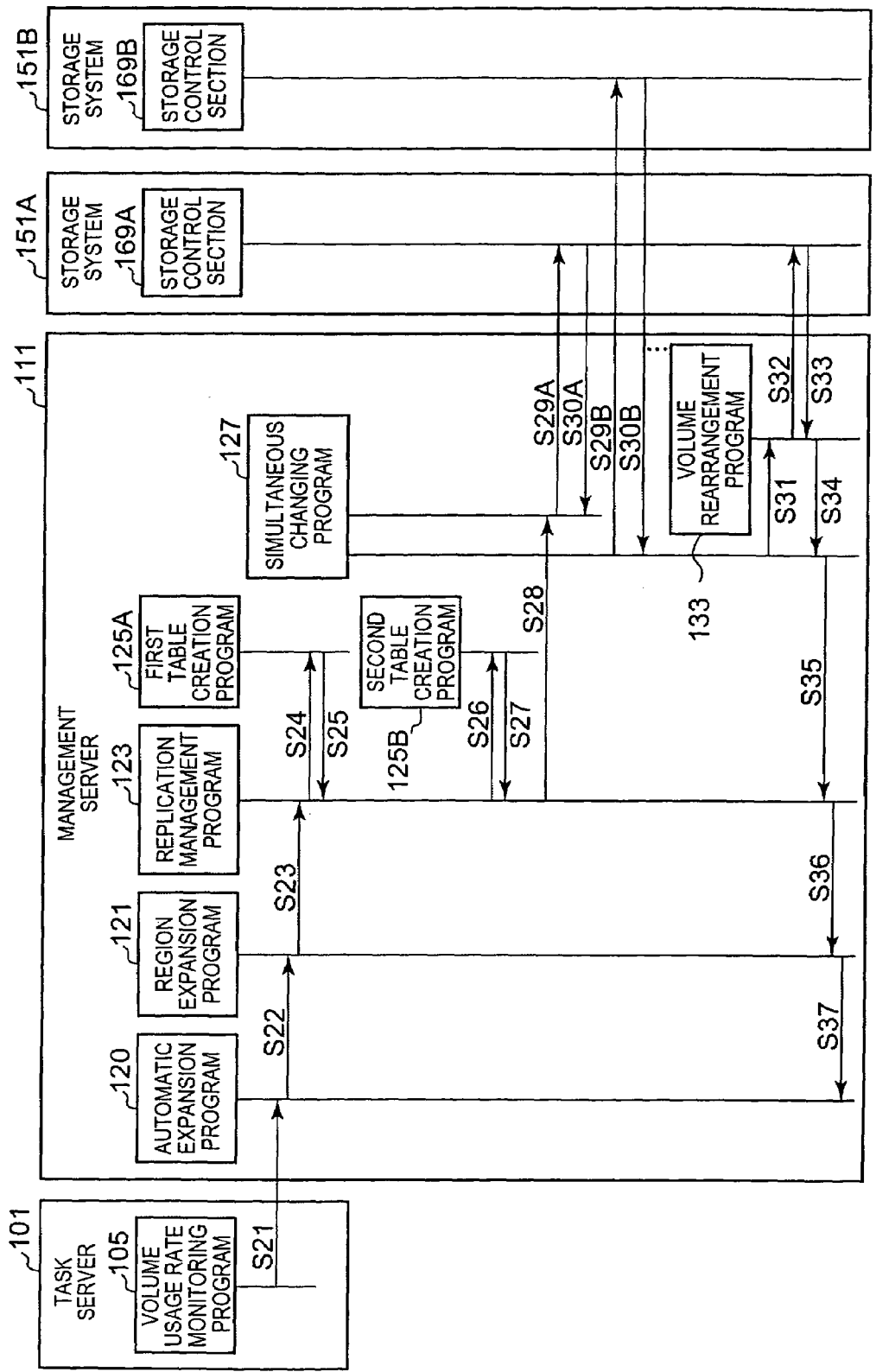
FIG. 15 shows an example of a flow of processing in the case in which expansion capacity is performed in accordance with the simultaneous changing method.

FIG. 15 shows an example of a flow of processing in the case in which expansion capacity is performed in accordance with the simultaneous changing method.

The flow from S21 through S27 is same as S1 through S7 described above.

When receiving the completion, the replication management program 123 calls the simultaneous changing program 127 (S28) to execute capacity expansion in accordance with the simultaneous changing method on the basis of the information registered in the expansion target replication volume table 147.

The simultaneous changing program 127 simultaneously expands the capacities of the volumes having the same attribute. FIG. 15 shows an example of the case in which capacity expansion is performed, starting from the volume closer to the original volume. The simultaneous changing program 127 issues a region expansion instruction (for example, an instruction including the LU-ID and a logical region ID to be newly allocated thereto) to the storage system 151A having the original volume (S29A). The storage control section 169A of the storage system 151A adds a logical region to the original volume in accordance with the region expansion instruction, thereby performing capacity expansion, and, after completion of capacity expansion, reports the completion to the nonsimultaneous changing program 129 (S29A).

Thereafter, if all of the plurality of "Secondary/Primary" replication volumes, which exist in the volume cascade to which the original volume belongs, are present in the storage system 151B, the simultaneous changing program 127 issues a region expansion instruction designating these replication volume, to the storage control section 169B (S29B). When issuing the region expansion instruction or when receiving a predetermined response in response to this region expansion instruction, the simultaneous changing program 127 can update the operating state in the expansion target replication volume table 147 to "in execution" for the designated replication volume. The storage control section 169B simultaneously expand the capacities of a plurality of designated replication volumes in accordance with the region expansion instruction, and returns a completion of capacity expansion regarding the completed replications (S30B). Regarding the replication volumes for which the completion is reported, the simultaneous changing program 127 can update the operating state in the expansion target replication volume table 147 to "completed".

Further, the simultaneous changing program 127 calls up the volume rearrangement program 133 according to need (when, for example, the situation described with reference to FIG. 9 is detected) (S31) to execute rearrangement of the volumes.

Thereafter, processing same as, for example, S14 through S19 described above is performed (S37 through S37).

Figure 16:
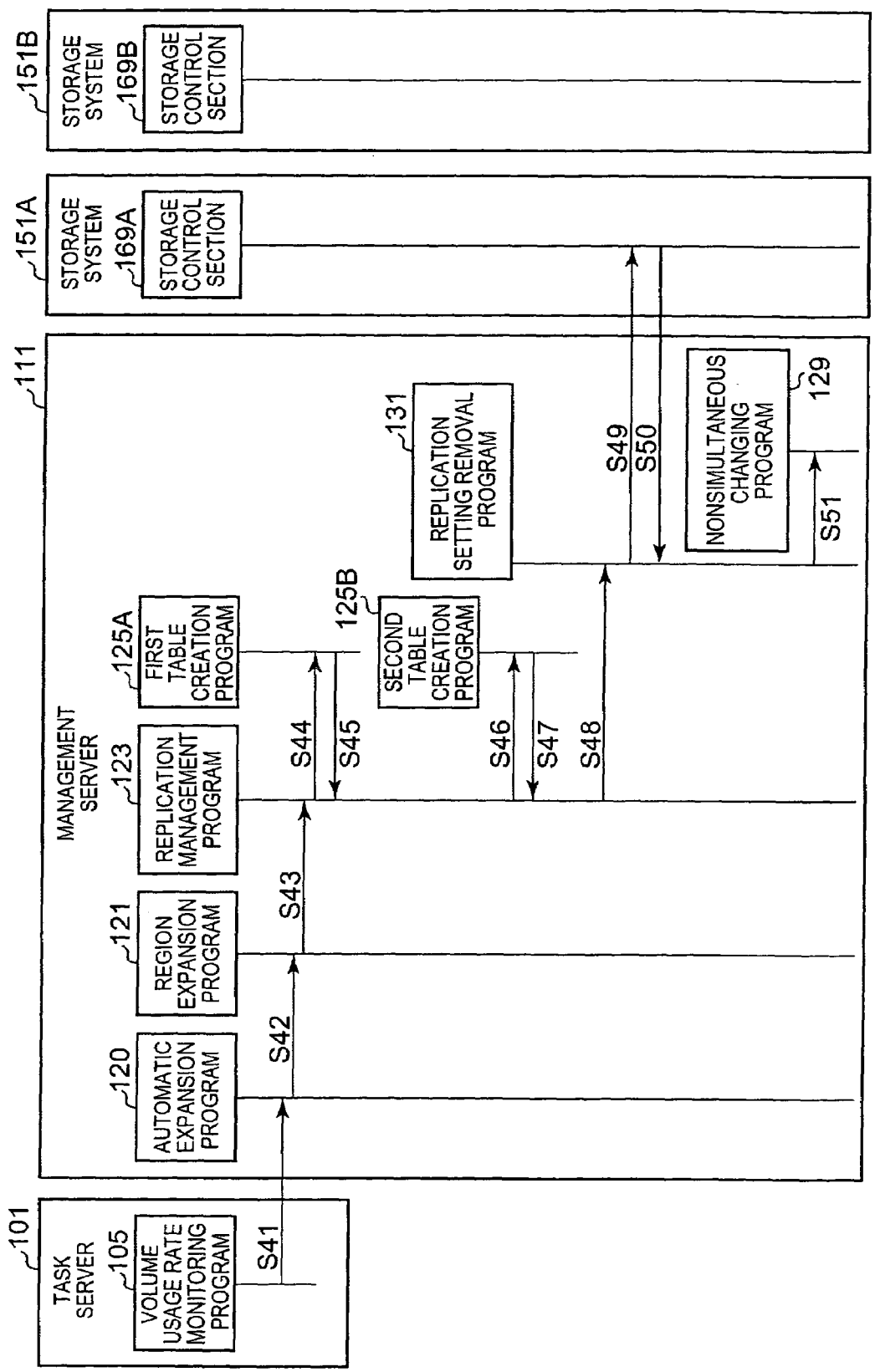
FIG. 16 shows an example of a flow of processing in the case in which replication removal is performed.

FIG. 16 shows an example of a flow of processing in the case in which replication removal is performed.

The flow from S41 through S46 is same as S1 through S6 described above.

When expansion/rearrangement cannot be performed for at least one volume of the volumes registered in the expansion target replication volume table 147 due to lack of free logical regions, the second table creation program 125B reports a return value "1" to the replication management program 123 (S47).

When the return value from the second table creation program 125B is "0", the replication management program 123 checks whether the replication automatic removal setting is set to "possible", and ends the processing if "impossible" is set. If "possible" is set, the replication management program 123 acquires a list of the difference between the expansion target replication volume tale 147 and the volume expansion/rearrangement relation table 143, and executes the replication setting removal program 131 for a group of volumes corresponding to the difference list (S48). The replication setting removal program 131 issues, to the storage system having a removal target volume (151A, for example), a command for removing the setting which indicates that each volume of the group of volumes is a replication volume (i.e. the setting indicating "Secondary" or "Secondary/Primary") (S49). The storage control section 169A removes a designated replication volume in accordance with the command. Specifically, for example, the storage control section 169A removes a volume type, "Secondary" or "Secondary/Primary", for the designated volume, from an unshown storage management table managed by the memory of the storage control section 169A (for example, a table in which a volume type is written for each volume). After the replication volume is removed, the storage control section 169A reports the completion of the removal to the replication setting removal program 131 (S50).

Thereafter, for example, the nonsimultaneous changing program 129 is called up as shown in the figure (S51), or the simultaneous changing program 127 is called up, although not shown. Specifically, capacity expansion is performed in accordance with the nonsimultaneous changing method or the simultaneous changing method.

The above is the outline of the flow of various processing performed by the computer system according to the present embodiment.

Hereinafter, processing performed by the computer programs executed in the management server 111 is described.

Figure 17:
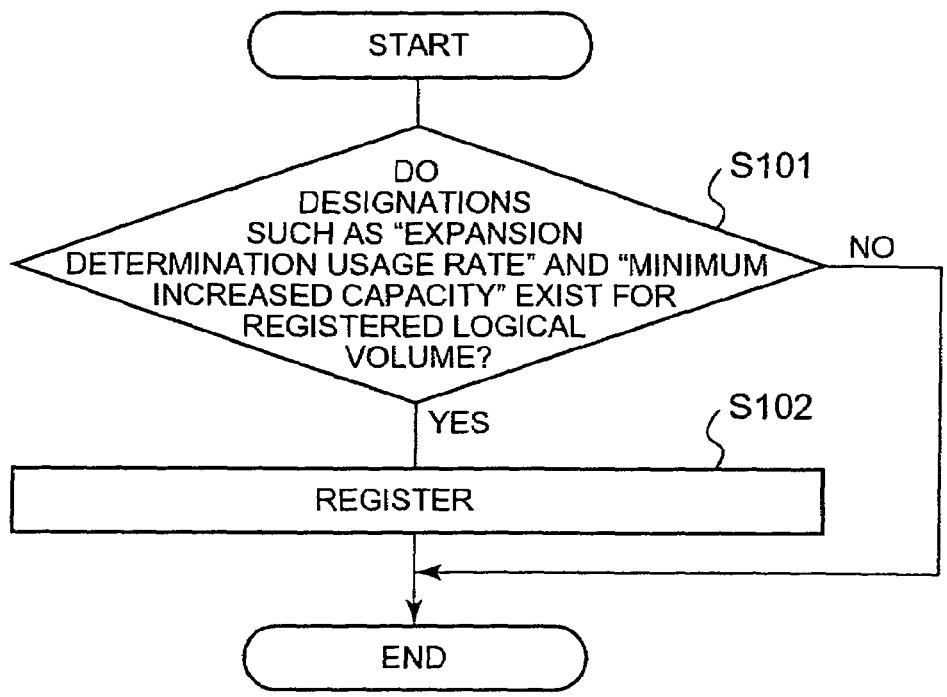
FIG. 17 shows an example of a flow of processing performed by a user setting program 117.

FIG. 17 shows an example of a flow of processing performed by the user setting program 117.

After receiving, from the manager, inputs of "expansion determination usage rate", "minimum increased capacity", "expansion method", "rearrangement method", and "replication automatic removal setting" for the logical volumes registered in the management server 111 (YES in S101), the user setting program 117 registers the inputted information on the columns corresponding to the LU-IDs of the logical volumes in the volume management table 141 (S102).

Figure 18:
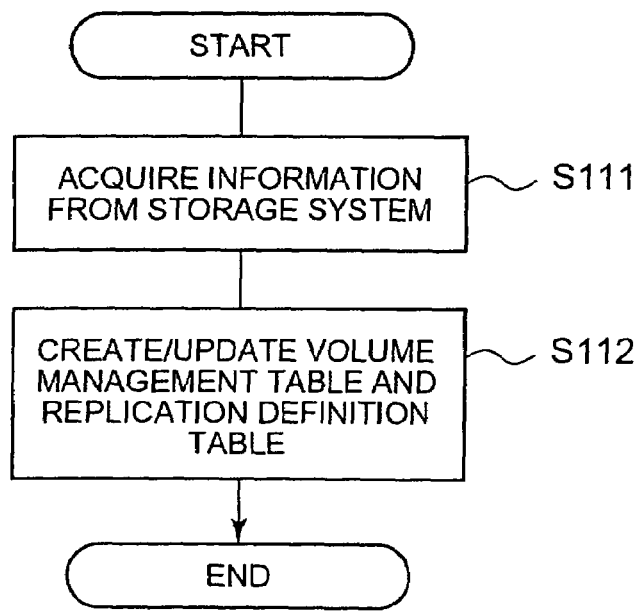
FIG. 18 shows an example of a flow of processing performed by a storage information acquisition program 119.

FIG. 18 shows an example of a flow of processing performed by the storage information acquisition program 119.

For example, suppose that the IDs of the storage systems, which are the targets of management by the management server 111, are registered in the memory 115 of the management server 111. From the storage systems which are identified from the storage system IDs, the storage information acquisition program 119 acquires the information managed in the storage systems (S111). The information includes, for example:

Logical region ID of each logical region, the capacity of same, ID of a RAID group to which the logical region belongs; and Allocated logical region ID of each logical volume, type of logical volume, primary destination information (LU-ID of the primary logical volume with respect to each logical volume, and the storage system ID).

The storage information acquisition program 119 create and/or updates the volume management table 141 and the replication definition table 145 on the basis of the acquired information (S112).

Figure 19:
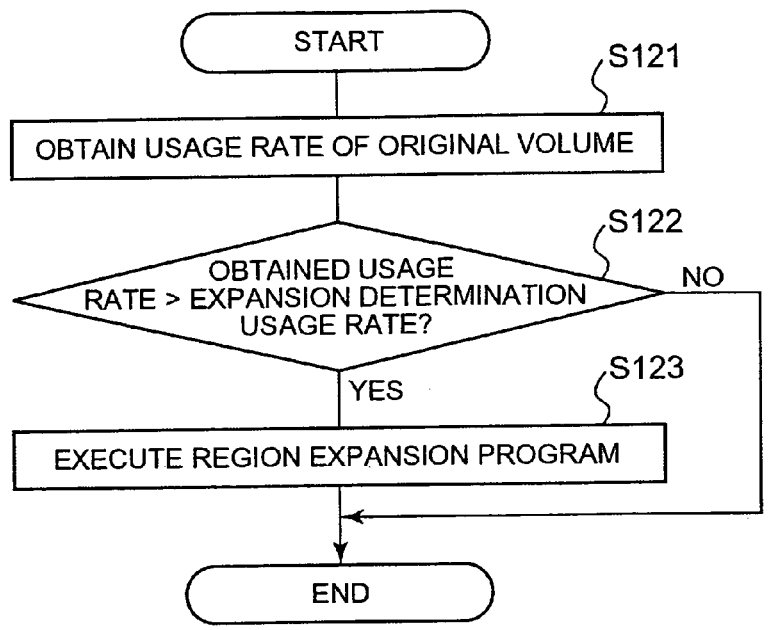
FIG. 19 shows an example of a flow of processing performed by an automatic expansion program 120.

FIG. 19 shows an example of a flow of processing performed by the automatic expansion program 120.

The automatic expansion program 120 obtains the LU-ID and usage rate of each volume from the volume usage rate monitoring program 105 (S121). When the obtained usage rate is higher than the expansion determination usage rate corresponding to the obtained LU-ID (YES in S122), the automatic expansion program 120 then executes the region expansion program 123 (S123). At this moment, the automatic expansion program 120 inputs the expansion target LU-ID (the obtained LU-ID) and the capacity of expanded volume.

Figure 20:
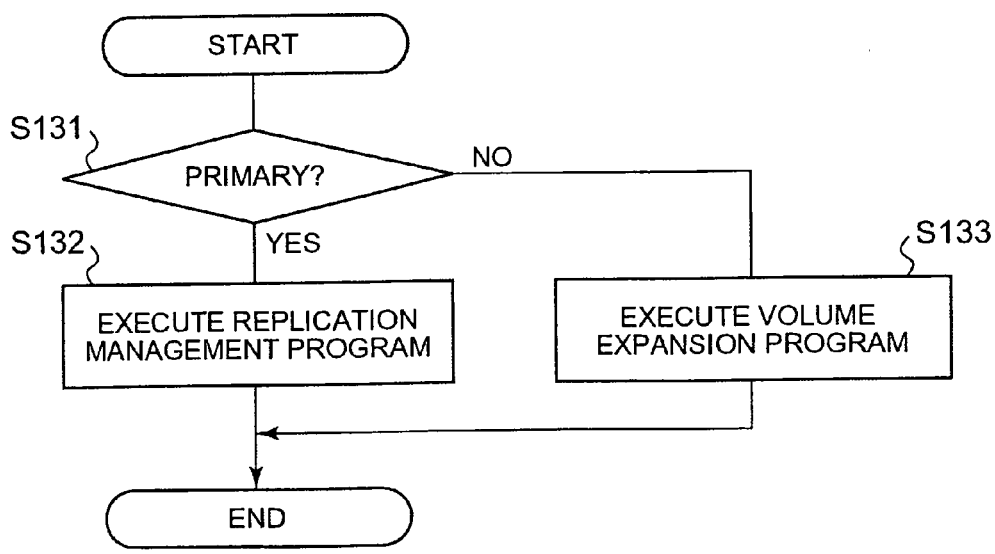
FIG. 20 shows an example of a flow of processing performed by a region expansion program 121.

FIG. 20 shows an example of a flow of processing performed by the region expansion program 121.

The region expansion program 121 refers to the replication definition table 145 by using the inputted expansion target LU-ID, and judges whether the volume type corresponding to the expansion target LU-ID is "Primary" or not (i.e. whether the volume corresponding to the expansion target LU-ID is the original volume or not) (S131).

As a result of S131, when the volume type is "Primary", the region expansion program 121 executes the replication management program 131 (S132). At this moment, the region expansion program 121 can input the expansion target LU-ID and the capacity of an expansion target-volume.

On the other hand, when the volume type is not "Primary" as a result of S131, the region expansion program 121 executes the volume expansion program 135 (S133). At this moment, the region expansion program 121 can select one or more unallocated logical region IDs from the logical region management table 139 and input the expansion target LU-ID and the selected one or more logical region IDs (referred to as "added target logical region ID" hereinafter). The sum of the capacities of the one or more logical regions corresponding respectively to the one or more added target logical region IDs is determined on the basis of the inputted capacity the expanded volume.

Figure 21:
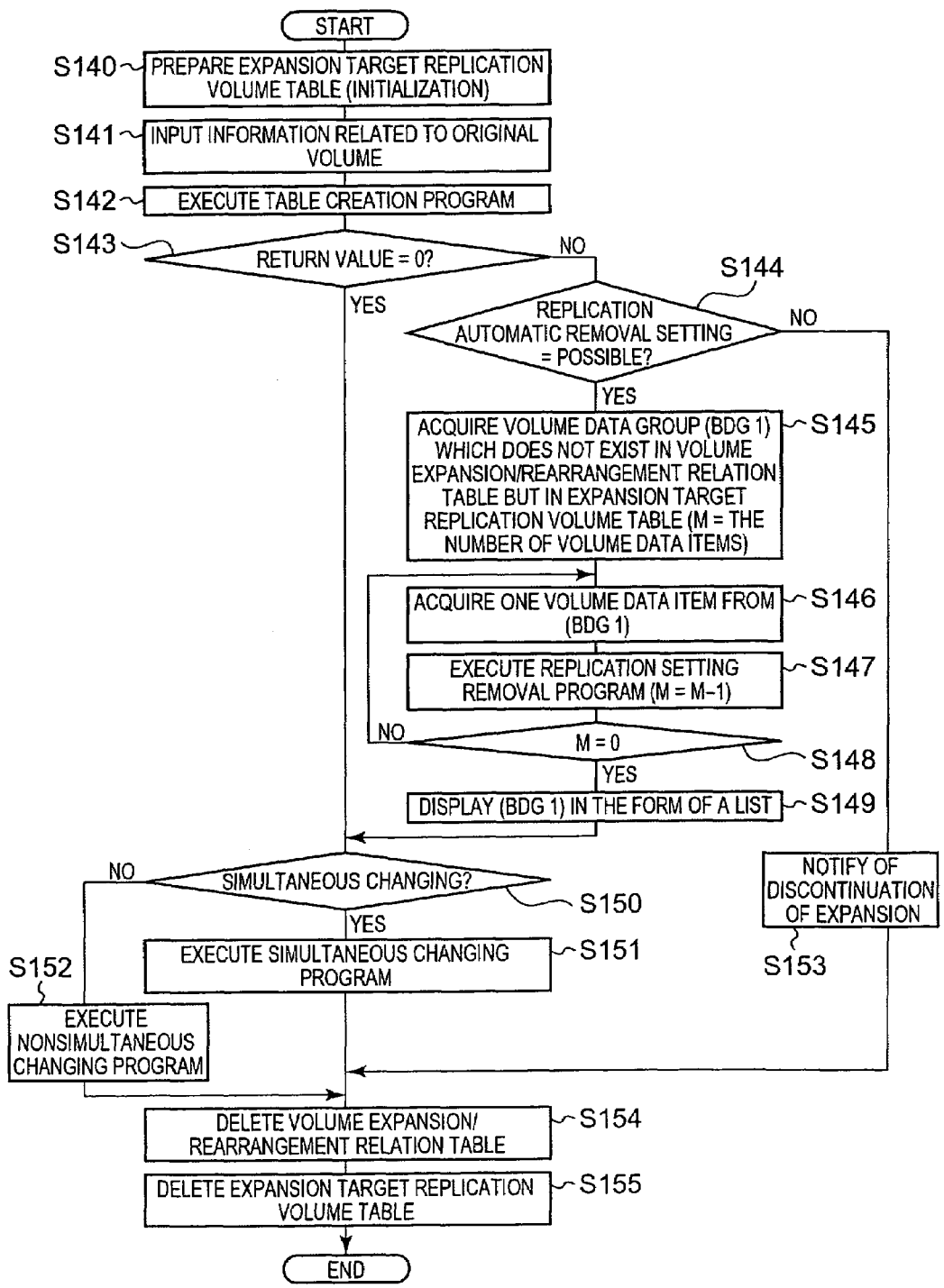
FIG. 21 shows an example of a flow of processing performed by a replication management program 123.

FIG. 21 shows an example of a flow of processing performed by the replication management program 123.

The replication management program 123 prepares an expansion target replication volume table for the volume corresponding to the inputted expansion target LU-ID (original volume) (S141). In the expansion target replication volume table created here, for example, all values are left blank.

Next, the replication management program 123 registers the information related to the original volume in the prepared expansion target replication volume table 147. Here, the information to be registered includes "1" as the ID, "0" as the hierarchy level, and "unexecuted" as the operating level, in addition to the information which can be acquired from, for example, the replication definition table 145 by using the expansion target LU-IDs.

Next, the replication management table 123 executes the first and second table creation programs 125A and 125B (S143). At this moment, the replication management table 123 inputs the abovementioned inputted capacity of expanded volume.

As a result, when the return value from the second table creation program 125B is "0", the replication management program 123 decides which one of the nonsimultaneous changing or simultaneous changing to perform (S150). When, for example, the "expansion method" associated with the expansion target LU-ID is "nonsimultaneous changing" (NO in S150), the replication management program 123 executes the nonsimultaneous changing program 129 (S152), and in the case of "simultaneous changing" (YES in S150), on the other hand, the simultaneous changing program 127 may be executed (S151). Alternatively, for example, the replication management program 123 may execute the nonsimultaneous changing program 129 in the case of at least one of the following (A) through (C): (A) the number of rows in the expansion target replication volume table 147 (in other words, the number of expansion target replication volumes) is small (less than a first threshold, for example); (B) the number of storage systems is small (less than a second threshold, for example); and (C) it is not desired to place a burden on the storage systems (for example, the burden needs to be suppressed to a predetermined amount). Moreover, for example, the replication management program 123 may execute the simultaneous changing program 127 in the case of at least one of the following (a) through (c): (a) the number of rows in the expansion target replication volume table 147 (in other words, the number of expansion target replication volumes) is large (equal to or more than a first threshold, for example); (b) the number of storage systems is large (equal to or more than a second threshold, for example); and (c) it is desired to end expansion/rearrangement in a shorter period of time compared to at least the nonsimultaneous changing method.

After S151 or S152, the replication management program 123 deletes the volume expansion/rearrangement relation table 143 (S154), and then deletes the expansion target replication volume table 147 (S155).

When the return value is not "0" in S143 (NO in S143), if the "replication automatic removal setting" associate with the expansion target LU-ID is not set to "possible" (NO in S144), the replication management program 123 notifies the manager of that expansion is discontinued (S153). Specifically, for example, the replication management program 123 displays a GUI indicating that expansion is discontinued due to lack of logical regions (lack of storage resources). Thereafter, S154 and S155 are carried out.

In S144, on the other hand, if the "replication automatic removal setting" associated with the expansion target LU-ID is set to "possible" (YES in S144), the replication management program 123 acquires a volume data group (BDG 1) which does not exist in the volume expansion/rearrangement relation table 143 but in the expansion target replication volume table 147 (the difference, specifically) (S145). At this moment, the replication management program 123 sets the number of volume data items existing in the volume data group (P), as a value m.

The replication management program 123 acquires one volume data item from one or more volume data items configuring the volume data group (BDG 1) (for example, a data item containing various information registered in one record in the expansion target replication table 147) (S146), executes the replication setting removal program 131 for this volume data item, and subtracts 1 from the value m (S147).

The replication management program 123 repeats S146 and S147 until m=0 is obtained (NO in S148).

As a result, when m=0 is obtained (YES in S148), the replicationmanagement program 123 displays the volume data group (BDG 1) in the form of a list (S149). Not only the whole volume data group (BDG 1), but any information may be displayed here as long as it is the information related to replication volumes subjected to replication removal. Furthermore, for example, in place of the abovementioned display method, the replication management program 123 may display the contents shown in FIG. 10 by means of a GUI. Accordingly, it is considered that the manager can easily understand the replication volumes which are subjected to replication removal and the configuration of the volume cascades.

After S149, the abovementioned S150 is carried out.

Figure 22:
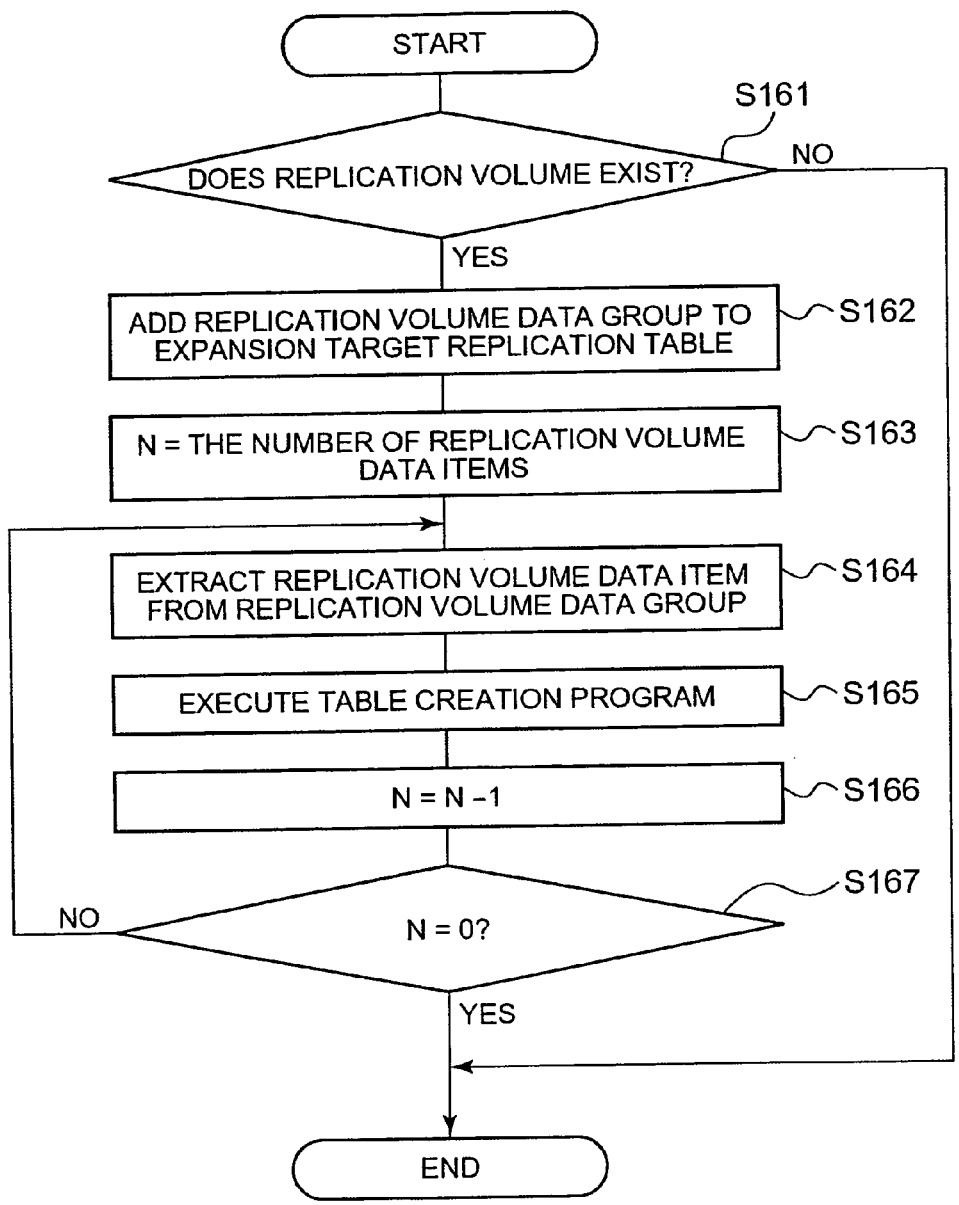
FIG. 22 shows an example of a flow of processing performed by a first table creation program 125A.

FIG. 22 shows an example of a flow of processing performed by the first table creation program 125A.

The first table creation program 125A judges, with reference to the primary destination information in the replication definition table 145 in FIG. 21, if there exists a replication volume which is obtained by taking a volume with the expansion target LU-ID registered in S141 as an original volume (S161).

If a replication volume exists as a result of judgment in S161 (YES in S161), the first table creation program 125A registers the data related to the existing replication volume ("replication volume data", hereinafter) into the expansion target replication volume table 147 (S162). Specifically, for example, the first table creation program 125A registers the data of replication volumes with lower hierarchy levels (closer to the original volume) as a record closer to the record in which the data of the original volume is written. The replication volume data contains not only the information which can be acquired from the replication definition table 145, but also, for example, IDs, hierarchy levels which can be understood from the column of "primary destination information", and the operating state="unexecuted".

The first table creation program 125A sets the number of replication volume data items in the registered replication volume data group as a value n (S163). The first table creation program 125A extracts a replication volume data item from the replication volume data group (S164), and executes the first table creation program 125A for creating the volume expansion/rearrangement relation table 143 (S165). At this moment, the capacity of expanded volume, which is inputted above, is inputted. Then, the first table creation program 125A subtracts 1 from the value n (S166).

The first table creation program 125A repeats S164 through S166 until n=0 is obtained (NO in S167), and ends the processing when n=0 is obtained (YES in S167).

Figure 23:
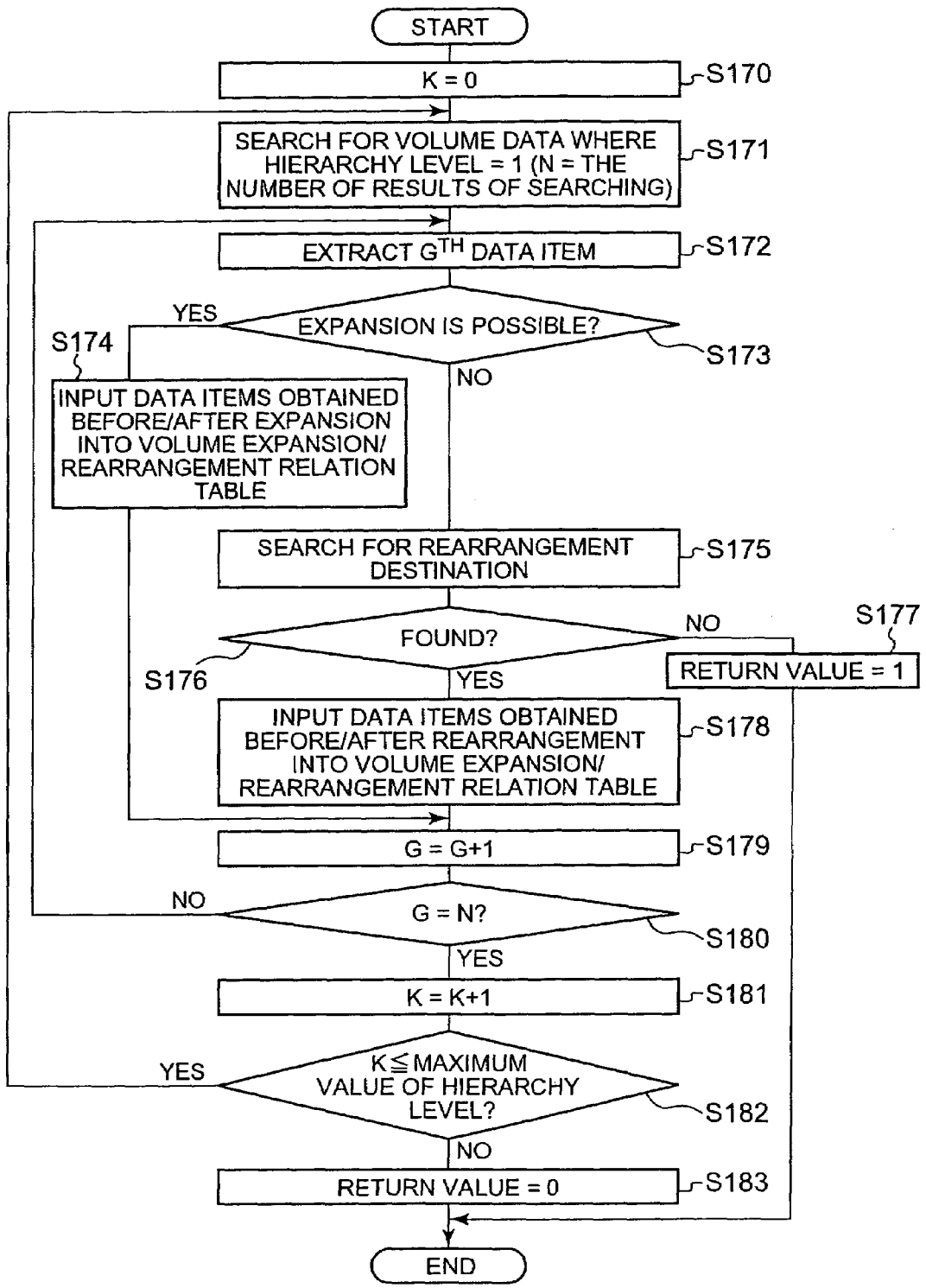
FIG. 23 shows an example of a flow of processing performed by a second table creation program 125B.

FIG. 23 shows an example of a flow of processing performed by the second table creation program 125B.

The second table creation program 125B sets 0 as a value k (S170). Further, for example, the second table creation program 125B can prepare the volume expansion/rearrangement relation table 143 in which the all items are left blank.

Next, the second table creation program 125B searches for a volume data item of the same hierarchy level as the value k from the expansion target replication volume table 147 (S171). The second table creation program 125B sets the number of results searched, i.e. the number of found volume data items, as a value N.

The second table creation program 125B extracts the $g^{th}$ (g is an integer of one or above) volume data item from one or more volume data items which are found from the searching (S172).

The second table creation program 125B judges whether capacity expansion can be performed on a volume corresponding to the extracted volume data (S173). For example, if the ID and the upper limit of the capacity of the RAID group to which this volume belongs are acquired and registered to the memory 115 beforehand, the second table creation program 125B judges whether the upper limit of the capacity of this volume is exceeded or not, even when the capacity of this volume is taken as the abovementioned capacity of expanded volume, which has been inputted.

If it is judged that capacity expansion can be performed as a result of S173 (YES in S173), the second table creation program 125B registers the volume data before expansion and the volume data after expansion to the volume expansion/rearrangement relation table 143 (S174). The capacity of volume data after expansion is, for example, the inputted capacity of expanded volume.

Thereafter, the second table creation program 125B adds 1 so the value g (S179). If g=N is not obtained (NO in S180), it means that unprocessed volume data remain in N number of volume data items, thus the second table creation program 125B performs S172 again. If g=N is obtained (YES in S180), it means that unprocessed volume data is not remained, thus the second table creation program 125B performs, as the next processing, processing of adding 1 to the value k, for example (S181).

As a result, if the value k after update is equal to or less than the maximum value of the hierarchy level registered in the expansion target replication volume table 147 (YES in S182), the second table creation program 125B performs S171 again. On the other hand, if the value k after update exceeds the abovementioned maximum value (NO in S182), expansion/rearrangement is performed on all replication volumes, thus the second table creation program 125B reports the return value=0 to the replication management program 123 (S183).

When it is judged in S173 that expansion is impossible (NO in S173), the second table creation program 125B searches for a rearrangement destination on the basis of the logical region management table 139 (S175). At this moment, for example, if the second table creation program 125B cannot find a rearrangement destination after searching for it on the basis of the logical region management table 139 corresponding to the storage systems in which replication volumes currently exist, the second table creation program 125B searches for a rearrangement destination on the basis of other logical region management table 139 of the storage systems. In this case, for example, when one or more unallocated logical regions with the abovementioned inputted capacity of expanded volume are found from either one of the logical region management tables 139, it means that a rearrangement destination is found (YES in S176), but if not, it means that a rearrangement destination is not found (NO in S176).

In the case of NO in S176, the second table creation program 125B reports the return value=1 to the replication management program 123 (S177).

In the case of YES in S176, on the other hand, the second table creation program 125B registers the volume data obtained before rearrangement and the volume data obtained after rearrangement in the volume expansion/rearrangement relation table 143 (S178). The capacity of the volume data obtained after rearrangement is, for example, the inputted capacity of expanded volume, and the logical region ID is an unallocated logical region ID which is discovered.

After S178, S179 described above is carried out.

Figure 24:
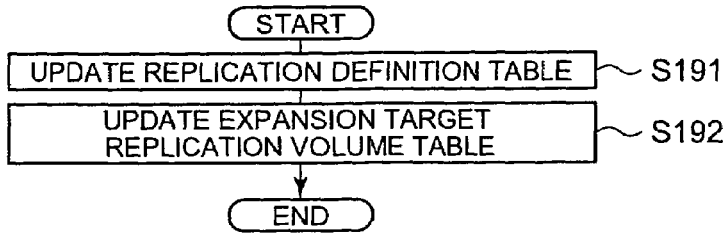
FIG. 24 shows an example of a flow of processing performed by a replication setting removal program 131.

FIG. 24 shows an example of a flow of processing performed by the replication setting removal program 131.

The replication setting removal program 131 deletes the information related to the volume data item of the volume which cannot be expanded/rearranged (volume data item acquired in S146 in FIG. 21) from the replication definition table 145 and from the expansion target replication volume table 147 (S191 and S192).

Figure 25:
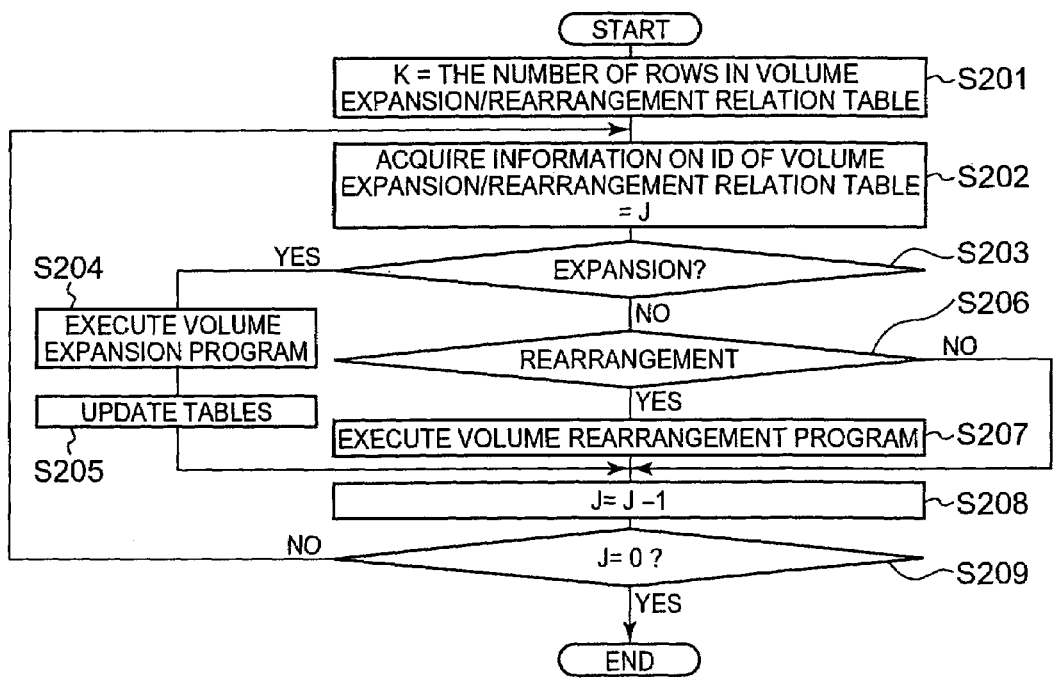
FIG. 25 shows an example of a flow of processing performed by a nonsimultaneous changing program 129.

FIG. 25 shows an example of a flow of processing performed by the nonsimultaneous changing program 129. It should be noted that FIG. 25 shows an example of a flow of processing by means of the nonsimultaneous changing method described with reference to FIG. 11A and FIG. 11B.

The nonsimultaneous changing program 129 sets the number of rows in the volume expansion/rearrangement relation table as a value k (S201).

Further, the nonsimultaneous changing program 129 acquires an information group (BDG 2) corresponding to an ID-j of the volume expansion/rearrangement relation table (S202).

If the information group (BDG 2) indicates expansion (YES in S203), the nonsimultaneous changing program 129 executes the volume expansion program 135 for this information group (BDG 2) (S204), and updates the logical region table 139, the volume management table 141, and the replication definition table 145 in response to a result of the execution (S205).

Next, the nonsimultaneous changing program 129 subtracts 1 from a value j (S208) and, if j=0 is not obtained (NO in S209), performs S202 again, or ends the processing if j=0 is obtained (YES in S209).

If the information group (BDG 2) acquired in S202 indicates rearrangement (NO in S203 and YES in S206), the nonsimultaneous changing program 129 executes the volume expansion program 135 for this information group (BDG 2) (S207).

After S207, S208 is carried out.

Figure 26:
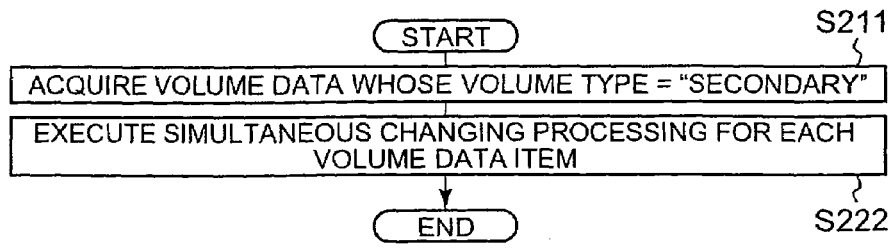
FIG. 26 shows an example of a flow of processing performed by a simultaneous changing program 127.

FIG. 26 shows an example of a flow of processing performed by the simultaneous changing program 127. It should be noted that FIG. 26 shows an example of a flow of processing by means of the simultaneous changing method described with reference to FIG. 12A and FIG. 12B.

The simultaneous changing program 127 acquires all volume data items whose volume type is "Secondary" from the expansion target replication volume data 147 (S211), and executes simultaneous changing for each volume data (S222). Thereafter, the simultaneous changing program 127 can delete the volume expansion/rearrangement relation table 143.

Figure 27:
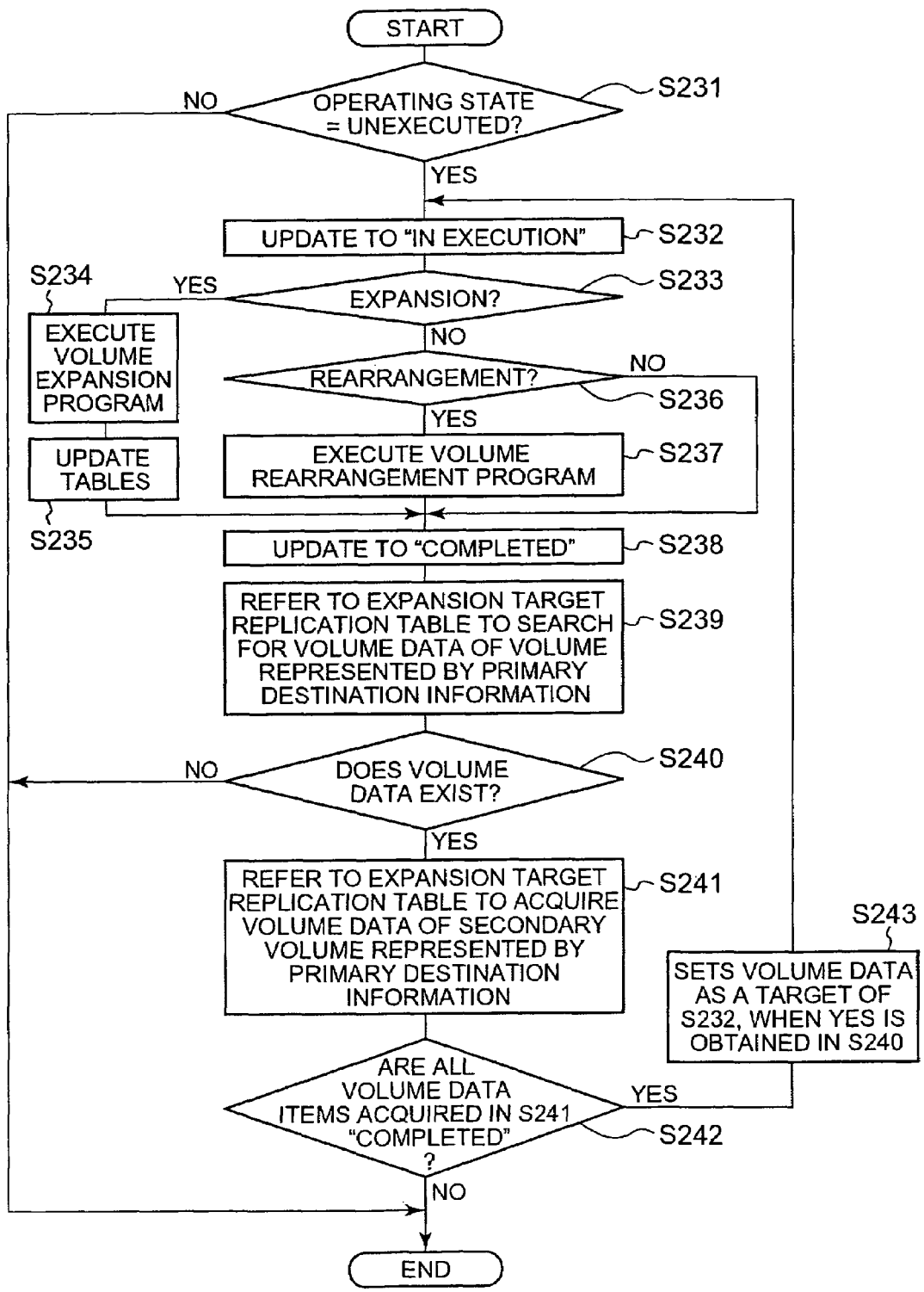
FIG. 27 shows an example of a flow of processing performed in an S222 of FIG. 26.

FIG. 27 shows an example of a flow of processing performed in S222 of FIG. 26.

If the operating state is "unexecuted" for each volume data whose volume type is "Secondary" (YES in S231), the simultaneous changing program 127 update this operating state to "in operation" (S232).

The simultaneous changing program 127 uses the LU-ID of each volume data whose volume type is "Secondary" to refers to the volume expansion/rearrangement relation table 143, and judges whether expansion or rearrangement is indicated for each information item registered in each record having each LU-ID.

In the case of expansion (YES in S233), the simultaneous changing program 127 executes a volume expansion program 135 (S234) for the volume data, and updates the logical region management table 139, the volume management table 141, and the replication definition table 145 in response to a result of the execution (S235).

Thereafter, the simultaneous changing program 127 updates the operating state of each volume data item from "in execution" to "completed" (S238).

Next, the simultaneous changing program 127 searches for primary destination information for each volume data whose operating state is changed to "completed" (S239). If the primary destination="none" is obtained (YES in S240), the simultaneous changing program 127 acquires, from the expansion target replication volume table 147, the volume data of the secondary volume of the volume represented by this primary destination information (S241). Accordingly, the volume data of an SVOL other than the SVOL whose operating state is updated to "completed" in S238 is acquired.

If the operating state of all volume data items acquired in S241 is "completed" (YES in S242), the simultaneous changing program 127 performs S232 for the volume data acquired in S241.

By means of the flows described in FIG. 26 and FIG. 27, capacity expansion is carried out in accordance with the simultaneous changing method described with reference to FIG. 12A and FIG. 12B.

Figure 28:
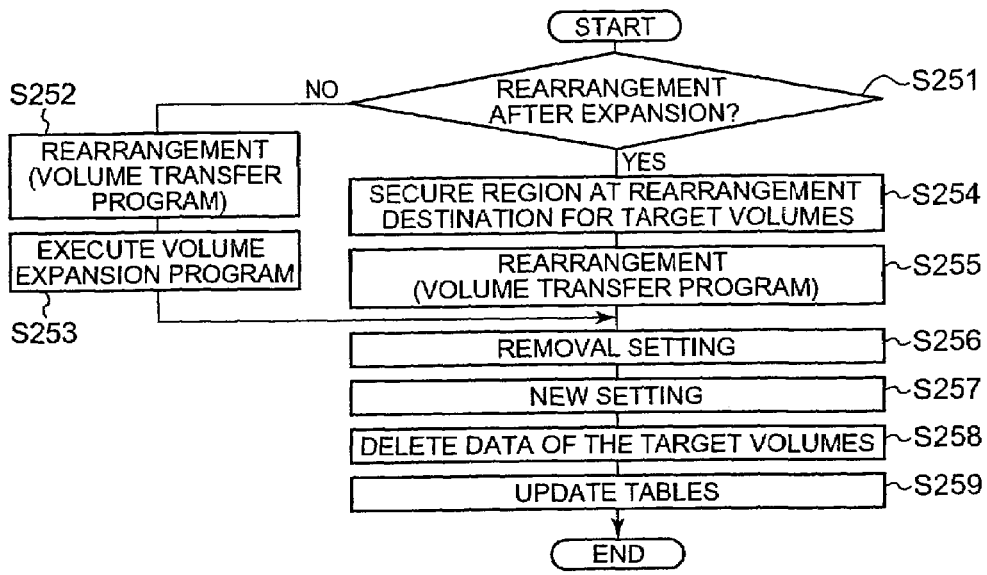
FIG. 28 shows an example of a flow of processing performed by a volume rearrangement program 133.

FIG. 28 shows an example of a flow of processing performed by the volume rearrangement program 133.

If the "rearrangement method" for the original volume of the target volume (the volume represented by the information group on the record, the volume being acquired from the volume expansion/rearrangement relation table 143) is not "rearrangement after expansion" (NO in S251), the volume rearrangement program 133 executes the volume transfer program 137 and thereby performs rearrangement (S252), and thereafter executes the volume expansion program (S253). If, on the other hand, the "rearrangement method" is "rearrangement after expansion" (YES in S251), the volume rearrangement program 133 secures a new volume having the capacity of expanded volume (one or more logical regions) in the rearrangement destination (RAID group or storage system) (S254), and performs rearrangement (S255).

After S253 or S255, the volume rearrangement program 133 deletes the volume type of the target volume (S256), and sets the deleted volume type for a new volume (S257). The volume rearrangement program 133 then deletes the information corresponding to the target volume from the volume expansion/rearrangement relation table 143 (S258), and updates the logical region management table 139, the volume management table 141, and the replication definition table 145 (S259).

Figure 29:
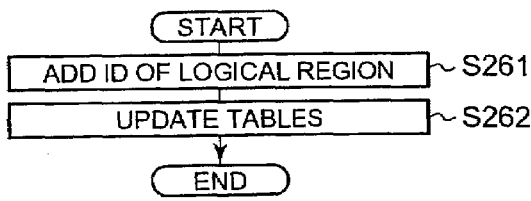
FIG. 29 shows an example of a flow of processing performed by a volume expansion program 135.

FIG. 29 shows an example of a flow of processing performed by the volume expansion program 135.

The volume expansion program 135 allocates the designated logical region ID (added target logical region ID) for the expansion target LU-ID (S261), and updates the logical region management table 139 and the volume management table 141 (S262).

Figure 30:
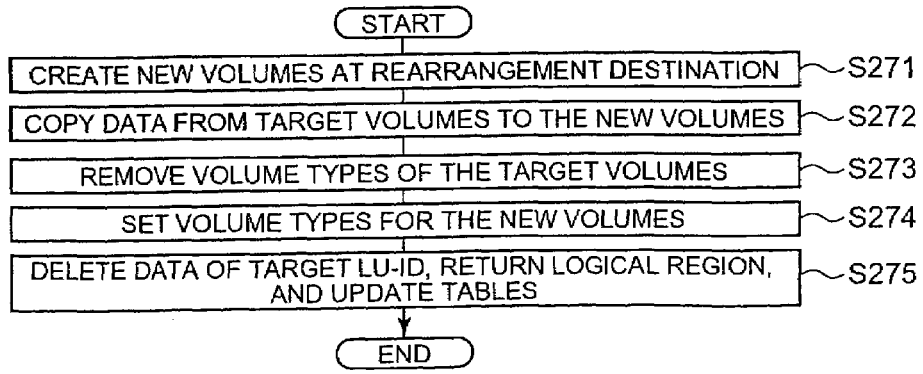
FIG. 30 shows an example of a flow of processing performed by a volume transfer program 137.

FIG. 30 shows an example of a flow of processing performed by the volume transfer program 137.

The volume transfer program 137 creates new volumes (a group of unallocated logical regions) having the capacity of expanded volume, in the rearrangement destination (RAID group or storage system) (S271).

Next, the volume transfer program 137 instructs the storage system in which the target volume (rearrangement target volume) and new volumes exists to copy the data inside the target volume to the new volumes (S272). Accordingly, the data inside the target volume is copied to the new volumes.

Thereafter, the volume transfer program 137 removes the volume type of the target volume (S273), and associates the removed volume type with the new volumes (S274).

Finally, the volume transfer program 137 deletes the data inside the target volume, returns the allocation flag of the logical region, which is allocated to the target volume, to "0", and updates the logical region management table 139, the volume management table 141, and the replication definition table 145 (S275).

As described above, according to the above embodiments, when the capacity of an original volume is expanded, all replication volumes belonging to the volume cascade of the original volume are specified from the replication definition table 145, and the specified all replication volumes are expanded automatically. Accordingly, the burden imposed on the manager can be reduced.

According to the above embodiments, when expanding the capacity of a volume, capacity expansion is performed so that the relationship in which the capacity of the downstream volume of a volume pair becomes at least the capacity of the upstream volume is maintained. Accordingly, this relationship can be prevented from being damaged when expanding the capacities of all volumes inside the volume cascade, thus the occurrence of fragmentation can be prevented.

Further, according to the above embodiments, when capacity expansion is performed so as to maintain the abovementioned relationship, at least one volume inside the volume cascade is relocated in other area when the upper limit of the capacity of a predetermined area (RAID group or storage system, for example) is exceeded. As a result, the length of the volume cascade can be maintained as much as possible.

Moreover, according to the above embodiments, in a predetermined case, e.g. in the case in which the storage resources become insufficient to the point where expansion/rearrangement can no longer be performed, replication volumes are deleted so that expansion/rearrangement can be performed. Although redundancy is impaired, capacity expansion of volumes belonging to the volume cascade can be performed automatically, while compensating a certain degree of redundancy.

The embodiments of the present invention are described above, but the embodiments are merely examples for describing the present invention and are not to limit the scope of the present invention. The present invention can be implemented in various ways without departing from the spirit of the present invention.

For example, various volumes can be employed as the logical volumes 153. Specifically, for example, the logical volumes 153 may be virtual logical volumes, or logical volumes to which logical regions are dynamically allocated in response to an access made to the logical volumes. For example, the volumes which are subjected to capacity expansion as disclosed in Japanese Patent Application Laid-Open No. 2003-15915 can be employed as the logical volumes. It should be noted that, when such logical volumes are employed, a virtual capacity and the sum of the capacities of one or more logical regions (actual capacity) allocated to the logical volumes may be registered to various tables. Moreover, the capacity to be expanded can be a virtual capacity, and the target to be compared with the upper limit of the capacity of the RAID group can be the virtual capacity. The actual capacity can be, for example, equal to or less than the virtual capacity.

Furthermore, for example, according to each row in the volume expansion/rearrangement relation table 143, the information group before execution (LU-ID and the like) is compared with the information group after execution (LU-ID and the like), whereby it can be judged whether to perform expansion or rearrangement. Instead, however, a code indicating expansion or rearrangement may be added in each row.

Moreover, for example, the volume which is set first as the target of capacity expansion may be not only an original volume but also a replication volume. For example, an instruction for performing capacity expansion can be issued to any of the volumes in the volume cascade.

What is claimed is:

1. A volume cascade system, comprising:
a management server;
a primary site storage device for storing a primary volume;
a secondary-primary site storage device for storing a secondary-primary volume backed up from the primary volume;
a secondary site storage device for storing a secondary volume backed up from the secondary-primary volume; and
a network coupling the management server, the primary site storage device, the secondary site storage device and the secondary site storage device,
where each of the primary site storage device, the secondary site storage device and the secondary site storage device includes:
a copy section which copies data stored in an upper-stream volume which is the primary volume or the secondary-primary volume to a lower-stream volume which is the secondary-primary volume or the secondary volume; and
a capacity expanding section which receives a capacity expansion instruction from the management server and expands a capacity of a logical volume stored in each storage device based on the capacity expansion instruction, and
the management server includes:
a cascade configuration storage section which stores volume cascade configuration information which is information related to a configuration of the volume cascade;
a capacity expansion target volume determination section which determines at least one of the primary volume, the secondary-primary volume and the secondary volume as a target of capacity expansion based on usage rate which exceeds a threshold;
a cascade configuration specifying section which specifies, based on the cascade configuration information, other logical volume related to the volume determined by the capacity expansion target volume determination section and determines amount of capacity expansion of the upper-stream volume and the lower-stream volume of which amount is more than those of the upper-stream volume; and
a capacity expansion control section which transmits, to at least one of the primary volume, the secondary-primary volume and the secondary volume, the capacity expansion instruction which designates two or more target volumes and the amount of capacity expansion determined by the cascade configuration specifying section,
wherein first the capacity expansion of the lower-stream volume is executed and next the capacity expansion of the upper-stream volume is executed based on the capacity expansion instruction.

2. A replication volume expansion method executed by a volume cascade system which comprises a management server, a primary site storage device for storing a primary volume, a secondary-primary site storage device for storing a secondary-primary volume backed up from the primary volume, a secondary site storage device for storing a secondary volume backed up from the secondary-primary volume, and a network coupling the management server, the primary site storage device, the secondary site storage device and the secondary site storage device, wherein each storage device of the primary site storage device, the secondary site storage device and the secondary site storage device, executes operations of:

copying data stored in an upper-stream volume which is the primary volume or the secondary-primary volume to a lower-stream volume which is the secondary-primary volume or the secondary volume; and receiving a capacity expansion instruction from the management server and expanding a capacity of a logical volume stored in each of the storage device based on the capacity expansion instruction, and the management server executes operations of:

storing volume cascade configuration information which is information related to a configuration of the volume cascade;

determining at least one of the primary volume, the secondary-primary volume and the secondary volume as a target of capacity expansion based on a usage rate which exceeds a threshold;

specifying, based on the cascade configuration information, other logical volume related to the determined volume and determining amount of capacity expansion of the upper-stream volume and the lower-stream volume of which amount is more than those of the upper-stream volume; and transmitting, to at least one of the primary volume, the secondary-primary volume and the secondary volume, the capacity expansion instruction which designates two or more target volumes and the determined amount of capacity expansion, wherein first the capacity expansion of the lower-stream volume is executed and next the capacity expansion of the upper-stream volume is executed based on the capacity expansion instruction.

* * * * *